(12) United States Patent
Kong et al.

(10) Patent No.: US 6,714,153 B1
(45) Date of Patent: Mar. 30, 2004

(54) DEVICE FOR ELECTROMAGNETIC DETECTION OF GEOLOGICAL PROPERTIES IN A WELL

(75) Inventors: Fan-Nian Kong, Oslo (NO); Svein Ellingsrud, Trondheim (NO); Vidar Sten-Halvorsen, Kongsberg (NO); Einar Stølen, Kongsberg (NO); Harald Westerdahl, Dal (NO); Terje Eidesmo, Ranheim (NO)

(73) Assignees: Den Norske Stats Oljeselskap A.S., Stavanger (NO); Kongsberg Offshore A.S., Kongsberg (NO); Norges Geotekniske Institutt, Oslo (NO)

( * ) Notice: Subject to any disclaimer, the term of this patent is extended or adjusted under 35 U.S.C. 154(b) by 0 days.

(21) Appl. No.: 09/719,638
(22) PCT Filed: Jun. 17, 1999
(86) PCT No.: PCT/NO99/00202
§ 371 (c)(1), (2), (4) Date: Feb. 28, 2001
(87) PCT Pub. No.: WO00/00851
PCT Pub. Date: Jan. 6, 2000

(30) Foreign Application Priority Data

Jun. 18, 1998 (NO) .............................. 19982824

(51) Int. Cl.⁷ .......................... G01S 13/88; G01S 13/00; G01V 3/30
(52) U.S. Cl. .......................... 342/22; 342/195; 342/196; 324/323; 324/332; 324/344
(58) Field of Search .................... 73/152.01–152.62; 324/323–377; 342/21, 22, 27, 28, 175, 192–197, 26, 59

(56) References Cited

U.S. PATENT DOCUMENTS

| | | | | |
|---|---|---|---|---|
| 4,161,731 A | * | 7/1979 | Barr | 342/22 |
| 4,275,787 A | * | 6/1981 | Helbig | 324/337 |
| 4,297,699 A | | 10/1981 | Fowler et al. | |
| 4,430,653 A | | 2/1984 | Coon et al. | |
| 4,504,833 A | | 3/1985 | Fowler et al. | |
| 4,670,717 A | * | 6/1987 | Sender | 324/338 |
| 4,704,581 A | | 11/1987 | Clark | 324/341 |
| 4,814,768 A | * | 3/1989 | Chang | 342/22 |
| 5,233,304 A | | 8/1993 | Hubans | 324/323 |
| 5,303,773 A | | 4/1994 | Czernichow et al. | |
| 5,323,114 A | * | 6/1994 | Nagamune et al. | 324/334 |
| 5,363,094 A | | 11/1994 | Staron et al. | |
| 5,530,359 A | | 6/1996 | Habashy et al. | 324/338 |
| 5,552,786 A | | 9/1996 | Xia et al. | 342/22 |
| 5,860,483 A | | 1/1999 | Havig | |
| 6,525,540 B1 | * | 2/2003 | Kong et al. | 324/338 |

FOREIGN PATENT DOCUMENTS

| | | |
|---|---|---|
| GB | 2 030 414 A | 4/1980 |
| WO | 97/37103 A1 | 10/1997 |

* cited by examiner

Primary Examiner—Bernarr E. Gregory
(74) Attorney, Agent, or Firm—Foley & Lardner

(57) ABSTRACT

The invention is a well radar for detecting, by electromagnetic wave reflection, resistivity horizons in production zones in oil wells. Transmitter and receiver antennas are combined in a tubing string antenna module. Two dipole transmitter antenna are positioned in a first position on either side of the tubing string antenna module. A first directionally sensitive group of four dipole receiver antennas is positioned in a second positioned so that the receiver antennas have even angular separation. Likewise, a second directionally sensitive group of four dipole receiver antennas is positioned in a third position opposite the first directionally sensitive group.

18 Claims, 23 Drawing Sheets

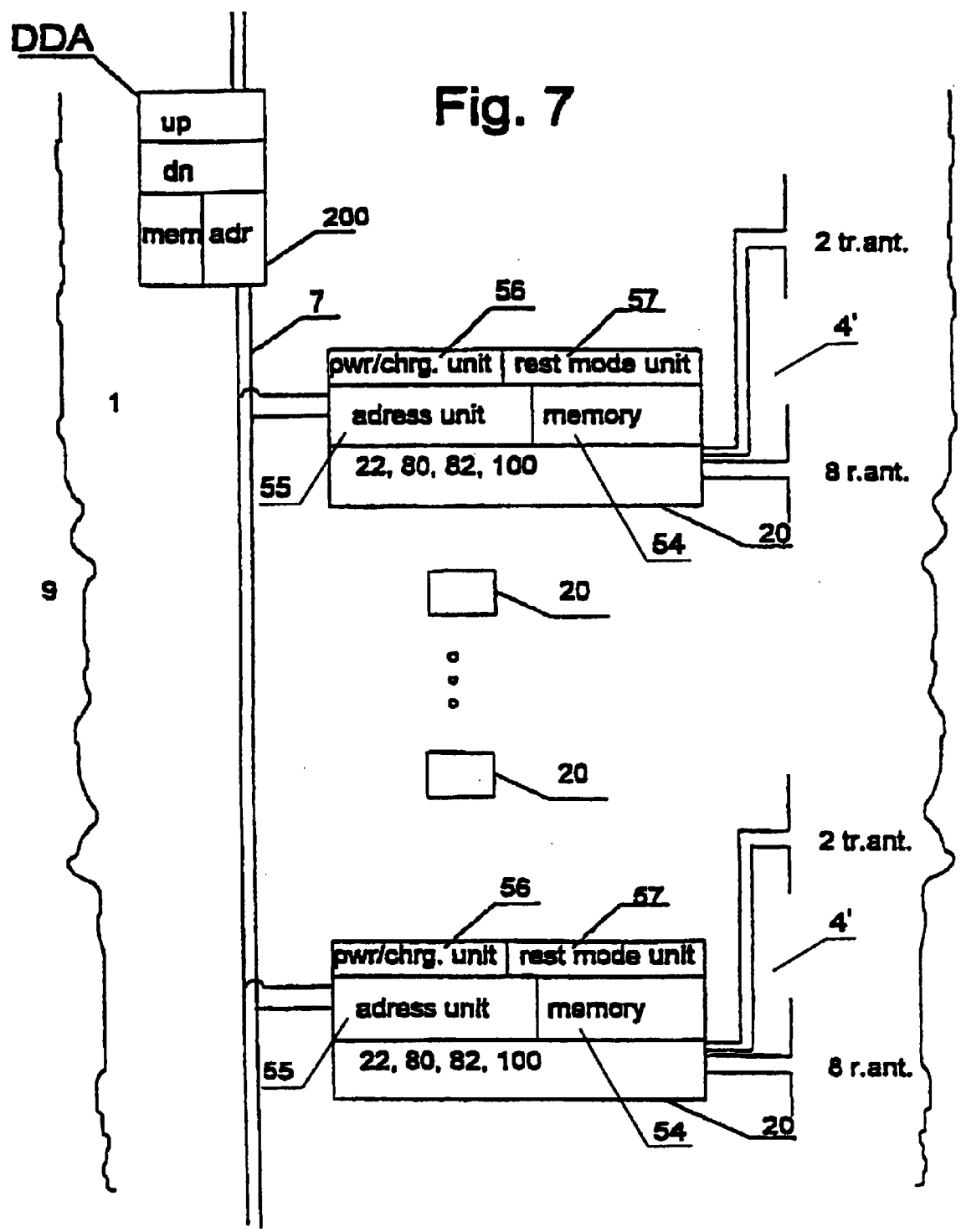

DEVICE FOR ELECTROMAGNETIC DETECTION OF GEOLOGICAL PROPERTIES IN A WELL

This is a national stage filing of PCT Application No. PCT/NO99/00202 filed Jun. 17, 1999.

BACKGROUND OF THE INVENTION

1. Field of the Invention

This invention concerns a radar-like device for use in production wells, that is arranged for detecting the oil/water contact in a reservoir rock.

More specifically the invention comprises: (a) a transmitter antenna for electromagnetic waves that is placed fixedly by a production tubing inside a geological formation; and (b) receiver antennas, also placed near a production tubing. This radar-like device is capable of detecting reflectors which constitute by electrically conductive surfaces inside the reservoir. One such surface of particular importance is the oil/water contact. The water front, in most instances, constitutes a relatively sharp transition between oil-bearing sand with high resistivity, to water-filled sand with low resistivity, thereby consisting a reflector.

2. Description of the Related Art

Borehole logging tools utilizing the radar principle are known from U.S. Pat. No. 4,670,717, U.S. Pat. No. 4,814,768, U.S. Pat. No. 4,297,699, U.S. Pat. No. 4,430,653, and GB 2,030,414. Some of these patents use methods where one must estimate a wave propagation speed in order to be able to interpret the radar signals.

Schlumbergers U.S. Pat. No. 5,530,359 "Borehole logging tools and methods using reflected electromagnetic signals" describes a logging tool with pulsed radar signals being transmitted from a transmitter antenna in a separate vertical section. The logging tool freely hangs in the borehole from a cable or in a coiled tubing. Linear antenna elements are arranged parallel to the tool's long z axis. Electromagnetic pulses are emitted with a center frequency of 40 MHz and with a highest frequency of 120 MHz. This pulse is radiated in all directions in the formation and is reflected by structures in the formation back to the tool in the borehole. The transit time for the pulse out to the structure and back to the tool is used for determining the distance between the reflecting structure and the borehole. Directional information is achieved by arranging receiver antennas about the entire periphery of the tool so that the reflecting structure's direction may be found by taking differences between the reflected signals. These differences may be calculated by means of electronic circuits, or subtraction may be performed by directly differentially coupled receiver antennas. One method for calculating the reflected signals' directions is given. One disadvantage with Schlumberger's patent U.S. Pat. No. 5,530,359 is that the instrument applies pulsed electromagnetic waves. this entails spreading of frequency components already in the emitted signal, and thereby the emitted signal pulse has a continuously varying group velocity. The reflected signal becomes smeared out causing an unclear image of the reflecting structures. Close reflecting structures will also dominate over the more remotely reflecting structures remote structures may be difficult to detect if the closer rocks have a relatively high conductivity/low resistivity. Another disadvantage of the Schlumberger instrument is that as it is not fixedly arranged by the geological formation, it is impossible to trace changes of the electrical parameters in the formation over a period of time, e.g. from one data to another. The instrument is also not capable of being applied in production wells or in injection wells.

Another apparatus is described in U.S. Pat. No. 5,552,786 "Method and apparatus for logging underground formations using radar", (Schlumberger). U.S. Pat. No. 3,552,786 describes a logging tool which partially solves the problem with the electromagnetic wave speed in the formations which are to be logged. The apparatus transmits an electromagnetic pulse insert a comma in close contact a borehole wall, into the formations and receives the direct wave in a predetermined distance along the borehole string from the transmitter. Thus the wave speed for the direct wave through the rocks (which may be invaded by borehole mud) can be calculated and the reflectors distances from the transmitter/receiver system may be calculated more exactly than if one had only an estimate of the wave speed.

U.S. Pat. No. 4,504,833 "Synthetic pulse radar system and method" describes a synthetically pulsed radar generating a plurality of signals of different frequencies simultaneously. The response from the formation those different frequencies simulates parts of the Fourier spectrum which would have been measured if one emitted a very short pulse which, according to the mathematical background, should be very broad in frequency spectrum. The system can however be used on board a vehicle because it is able to generate all the component signals simultaneously.

U.S. Pat. No. 4,275,787 "Method for monitoring subsurface combustion and gasification processes in coal seams" describes a radar for detecting a combustion front in a geological formation, for example a coal bearing formation. Because resistivity generally increases with temperature, such a combustion front will display high resistivity and constitute a very large contrast with respect to the coal bearing formation which normally will display low resistivity. The attenuation: (a) exceeds 100 dB/wave length in the combustion front; (b) is one dB/wave length in "Pittsburgh coal"; and (c) is 3 dB/wave length in "British coal." A detection range of the combustion front is 100 meters, an unrealistically large distance when one takes in consideration the conditions in an oil well with the attenuation of the signal being much higher and where it is very difficult to detect reflecting surfaces only one to two out in the reservoir. A swept signal varying continuously between a lowest and a highest frequency is emitted. Whereas the combustion front is displaced, one will by subtraction of the received signals be able to see a change corresponding to the difference between the signals. However, that patent does not consider the need for tuning the transmitter antennas when the transmitter antennas are situated very close (e.g. a few millimeters) to a metallic tubing surface (e.g., the linear tubing or a completion tubing.

SUMMARY

The invention is made partially on the background of the potential problems which could arise in connection with petroleum production on the Troll oilfield in the North Sea. As described below the resistivities in the actual geological formations are relatively lower with respect to the conditions described in the known art. Thus, it is not feasible to perform detection by means of electromagnetic waves according to the known art.

1. Expected Resistivity

A map of the Troll Oilfield generally covering the licence blocks 31/2, 31/3, 31/5 and 31/6 is shown in FIG. 3a. Resistivity data are available from five wells: 31/2-2 (FIG. 3b), 31/2-4 (FIG. 3c), 31/2-5 (FIG. 3d), 31/2-6 (FIG. 3e), and 31/2-7 (FIG. 3f). The graphs display resistivity in Ωm as a function of logging depth in generally vertical wells through the reservoir rocks. The oil/water contact, hereafter called "OWC," is defined in the wells by the depths marked in the respective graphs. The distribution of resistivity with respect to depth is markedly different from well to well. In 31/2-2 the resistivity Rt varies between about 3 Ωm and 1.3 Ωm over the OWC while Rt in well 31/2-4 decreases from 100 Ωm to 1 Ωm over the OWC. In well 31/2-5 the resistivity varies between 40 Ωm and 80 Ωm before it starts to decrease monotonously, about 1 meter above the OWC. By the OWC the resistivity falls by about 7 Ωm. The development in well 31/2-6 is characterized by a relatively strong "ripple" between 8 Ωm and 14 Ωm, even though the resistivity drop is clear by the OWC. Well 31/2-7 has a low and relatively little varying Rt in the area between 7 meters above the OWC and down to the OWC, with a maximum of approximately 2 Ωm and falling to approximately 0.4 Ωm just before the OWC.

The resistivity curves show that local variations in Rt may be much larger than the drop in Rt that takes place at the OWC. Because the conductivity of the formations generally arises from saline water in pore spaces or conductive schists, local variations may be due to varying reservoir quality in the form of a combination of clay mineral content and porosity. Parameters like local lithology, texture, facies and overpressure will also affect the resistivity. Resistivity tools are generally quite precise and give repeatable measurements. Generally the depth resolution is small, about 10 cm per measurement point, and the logs are smoothed to a certain degree by the contact assembly of the instrument (so the local formation resistivity will vary more than shown by the logs).

2. Expected Dielectric

No dielectrical logs are available from the Troll Oilfield. Here, dielectrical data are applied based on estimates of the known dielectrical properties in sandstone, oil and water. We select a dielectric constant for rock, $\epsilon_{rock}$=7. When δ is 0.20 (20% porosity), the dielectric constant for oil saturated sandstone $\epsilon_{ro}$ equals 5.82. Accordingly, $\epsilon_{ro}$=6 is a reasonable estimate of the dielectric constant for oil saturated sandstone.

The relative dielectric constant for sea water, using frequencies which apply to this invention, is $\epsilon_{water}$=80 (King & Smith, 1981). The dielectrical constant in water saturated sandstone is $\epsilon_{rw}$=13. FIGS. 4a, b, c, d, and e display estimated distributions of relative dielectrical values based on the water saturation in a five meter transition zone generally over but slightly across the OWC in the same wells represented in FIGS. 3b–f. The scale indicates that the relative dielectric constant is from about 6 to about 13.

3. Wave Propagation in a Conductive Transition Zone

FIG. 5a displays an attenuation graph for electromagnetic waves in the frequency range between 1 MHz and 200 MHz. $\epsilon_r$=6 whereas the resistivity $R_{DC}$ is varied in steps of 5 Ωm from 5 Ωm to 30 Ωm. The higher the resistivity, the more "transparent" the rocks become to electromagnetic radiation.

FIG. 5b, with the same frequency range, displays graphs with a constant $R_{DC}$=30 Ωm whereas $\epsilon_r$ varies from 6, 8, 10, 12, 14, to 16. One can see that the dielectric constant has less effect on the attenuation than the resistivity. The graphs show that the attenuation is more than 10 dB/m for 30 Ωm and frequencies above 12 MHz. An attenuation above 10 dB/m yields a return attenuation of more than 100 dB from a reflector at a distance of 5 meters.

FIG. 5c displays a section of the frequency range from FIG. 5a, between 1 and 16 MHz. The attenuation is still high for resistivities below 10 Ωm even in this low frequency range. FIG. 5d displays the waves' phase velocities as a function of frequency between 1 and 16 MHz. Thus, on the background of the attenuation, the frequencies applied in a preferred embodiment of the invention may be between 1 and 16 MHz. Within this frequency range, the phase velocity varies strongly with the resistivity which may give strong dispersion of an electromagnetic signal with a broad frequency content.

4. Reflection and Backscattering

All horizons with electromagnetic resistivity contrast in the well will result in reflections. Particles with higher conductivity (e.g., metal oxides), will entail a dispersion of the electromagnetic waves. Near horizons will become detected more strongly than remote horizons if the resistivity contrasts are equal (due to approximately spherically geometric spreading). This means that the reflexes from the resistivity contrast of the OWC may be masked behind a large number of strong reflexes from local resistivity contrasts in the sandstone in the oil zone over the OWC. For example, the resistivity contrasts represented by the gradients (i.e., derivatives) of Rt at 1578 meters and at 1580.5 meters depth in FIG. 3e will give strong reflexes which initially are not different from the reflex at the OWC.

One purpose of this invention is to provide a system to measure the depth of the oil/water or the gas/water contact in a petroleum reservoir by means of electromagnetic waves.

Another purpose is to provide an instrument arranged for registering and mapping the distribution of resistivity in the petroleum reservoir around the well and, to apply this resistivity to geological interpretations of the reservoir.

The above mentioned problems are remedied by means of the present invention being a device for radar detection in a well in a geological formation. The new and inventive invention includes:

(a) at least one transmitter antenna for emission of electromagnetic waves arranged along a tubing string in a fixed and permanent position, and shielded with respect to the geological formation, and (b) at least one (and preferably more) receiver antenna for receiving the reflected electromagnetic waves arranged along the tubing string in a fixed and permanent position, and unshielded with respect to the geological formation.

Additional features of the invention will become apparent to one of ordinary skill in the art upon reading this disclosure.

BRIEF DESCRIPTION OF THE DRAWINGS

The invention in the following paragraphs will be described in detail with non-limiting examples of preferred embodiments of the invention and, with reference to the accompanying drawing figures of the non-limiting examples:

FIG. 7 is a diagram of components that may enter into an electronics package arranged at each particular module including, among other things, an energy supply, a control unit for the transmitter- and receiver antennas, a signal processor and a communication device.

DETAILED DESCRIPTION OF THE INVENTION

Figure 1:
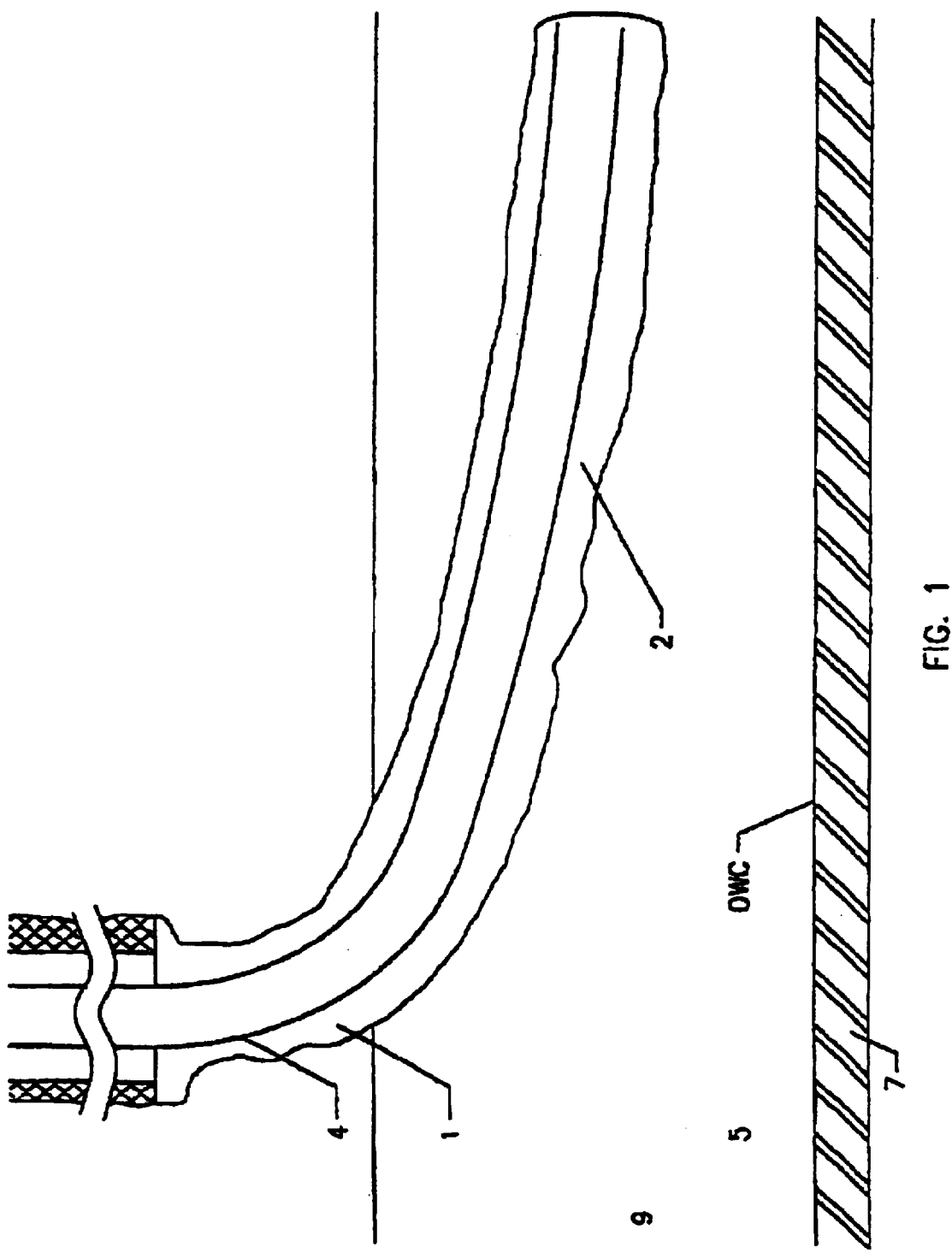
FIG. 1 illustrates a part of a production well with production tubing in a geological production zone for petroleum fluids, with oil and gas being above of the production zone, and water below.

FIG. 1 displays a production well or borehole 1 in a geological formation, which may be on land or likely below the sea bottom usually, a steel casing will be inserted in several sections, into the drilled hole, from the seabed and down to the top of the formation producing petroleum fluids such as oil or natural gas. The producing formation may be without a liner pipe, a so-called open completion, or have a liner pipe of a composite material being transparent to electromagnetic waves. In a preferred embodiment of this invention a liner tube will not be inserted into the production zone, but there will be a cementing of a production tubing in the well 1. The geological formation will, in this context, comprise a reservoir rock (e.g.) a porous, permeable sandstone formation 9). The borehole 1 may be more or less deviation drilled and may be, as shown in the figure, nearly horizontal. However the invention may be applied in boreholes with all deviation angles from the vertical downwards direction between 0 and 180 degrees. A production tubing 4 is arranged for completion of the production well or the borehole. The production tubing's 4 diameter may be 7" in an 8½" borehole 1. A liner pipe (not shown) is usually arranged outside the production tubing 4. The liner pipe may be cemented and perforated, or consist of a fine mesh retaining sand and letting oil, gas and water pass through. A preferred embodiment of the invention will be applied in a nearly horizontally drilled production well in a sandstone formation 9. An oil/water contact OWC constitutes the limit between the essentially oil-saturated sandstone 5 and the water-saturated sandstone 7. This invention may also be applied in an injection well or in an observation well.

At least one transmitter antenna 2 for emission of electromagnetic waves is fixedly arranged by the tubing string 4. The transmitter antenna 2 is fixedly mounted with respect to the geological formation, and is, in electrical terms, not shielded with respect to the geological formations, and is mounted for being permanently located in the well. At least one receiver antenna for receiving reflected 8 for electromagnetic waves is also mounted along the tubing string 4. The receiver antenna 8 is also fixedly mounted with respect to the geological formation, and is, in electrical terms, unshielded with respect to the geological formations, and is mounted for being permanently located in the well. The purpose of the fixed arrangement in the production zone is that measurements may be performed with some time interval if it is difficult to detect horizons by means of pulsed radar measurements. If the OWC has displaced itself during the interval between measurements, one may by means of subtraction of the measurements detect the actual change, and estimate the position of the OWC.

Figure 2:
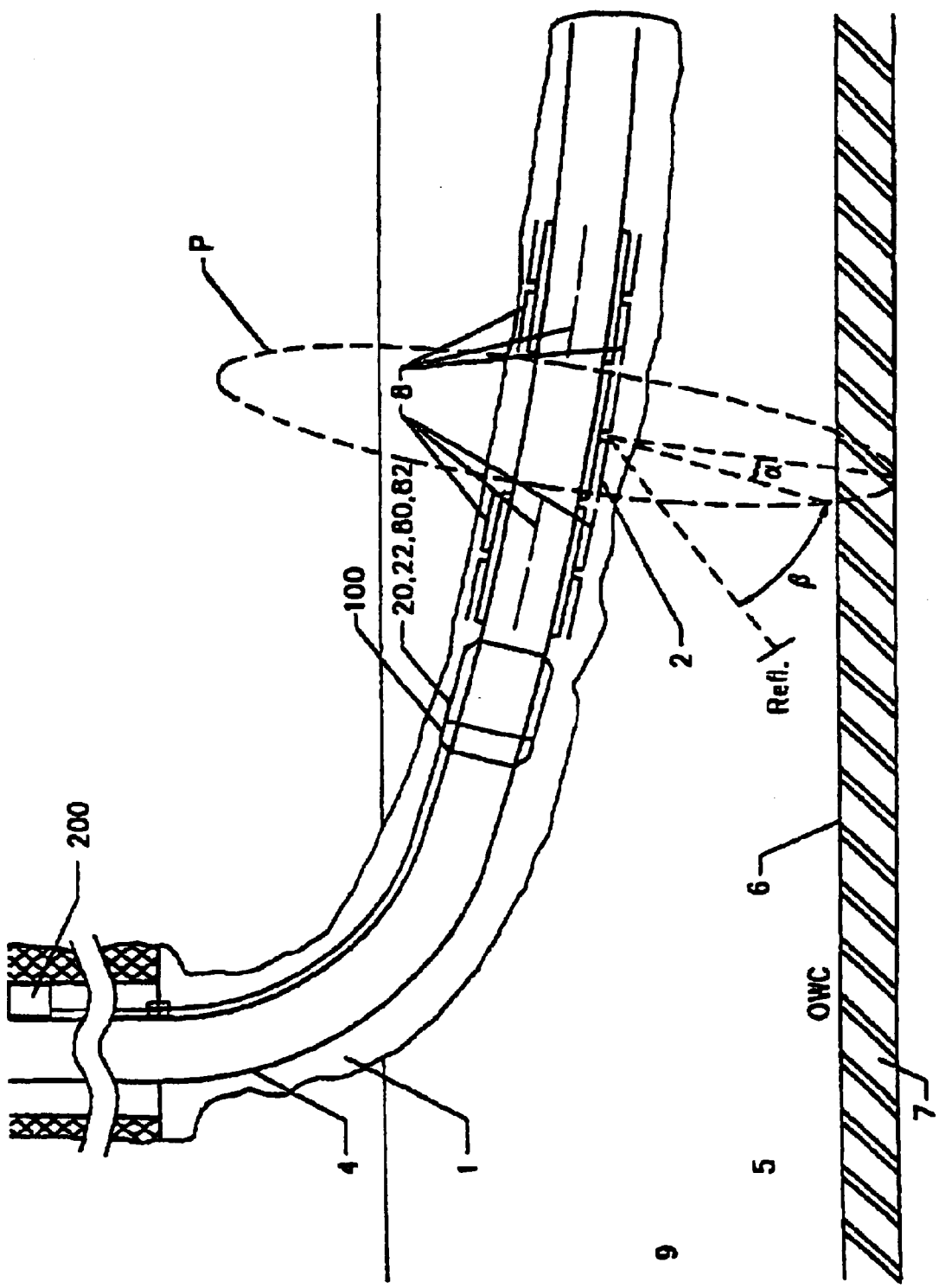
FIG. 2 illustrates schematically an embodiment of the invention arranged along a production tubing.
Figure 3A:
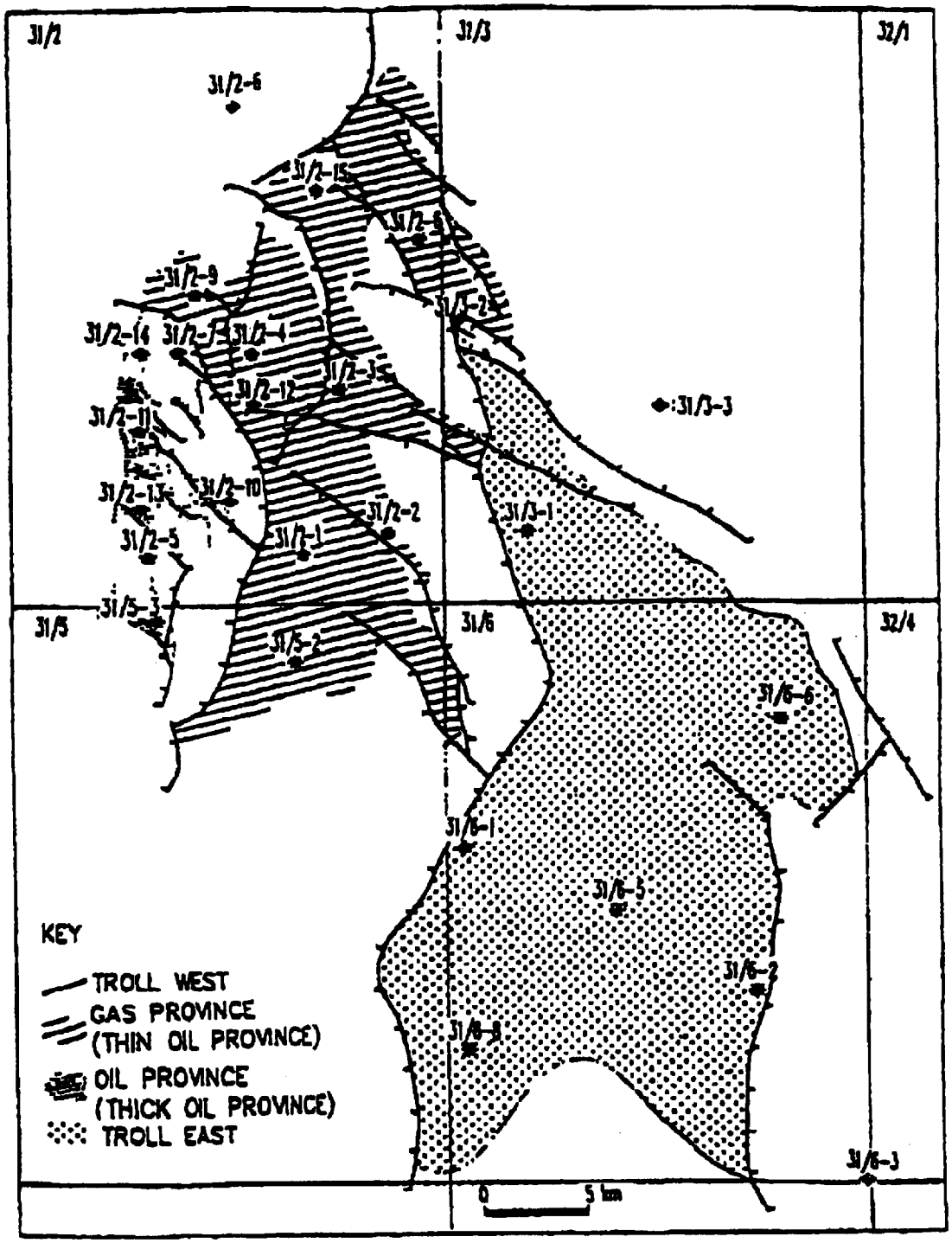
FIG. 3a displays a map of licence blocks of the Troll Oilfield of the North Sea, and FIGS. 3b, c, d, e, and f display logs of resistivity as a function of depth in five vertical boreholes in the Troll Oilfield.
Figure 3B:
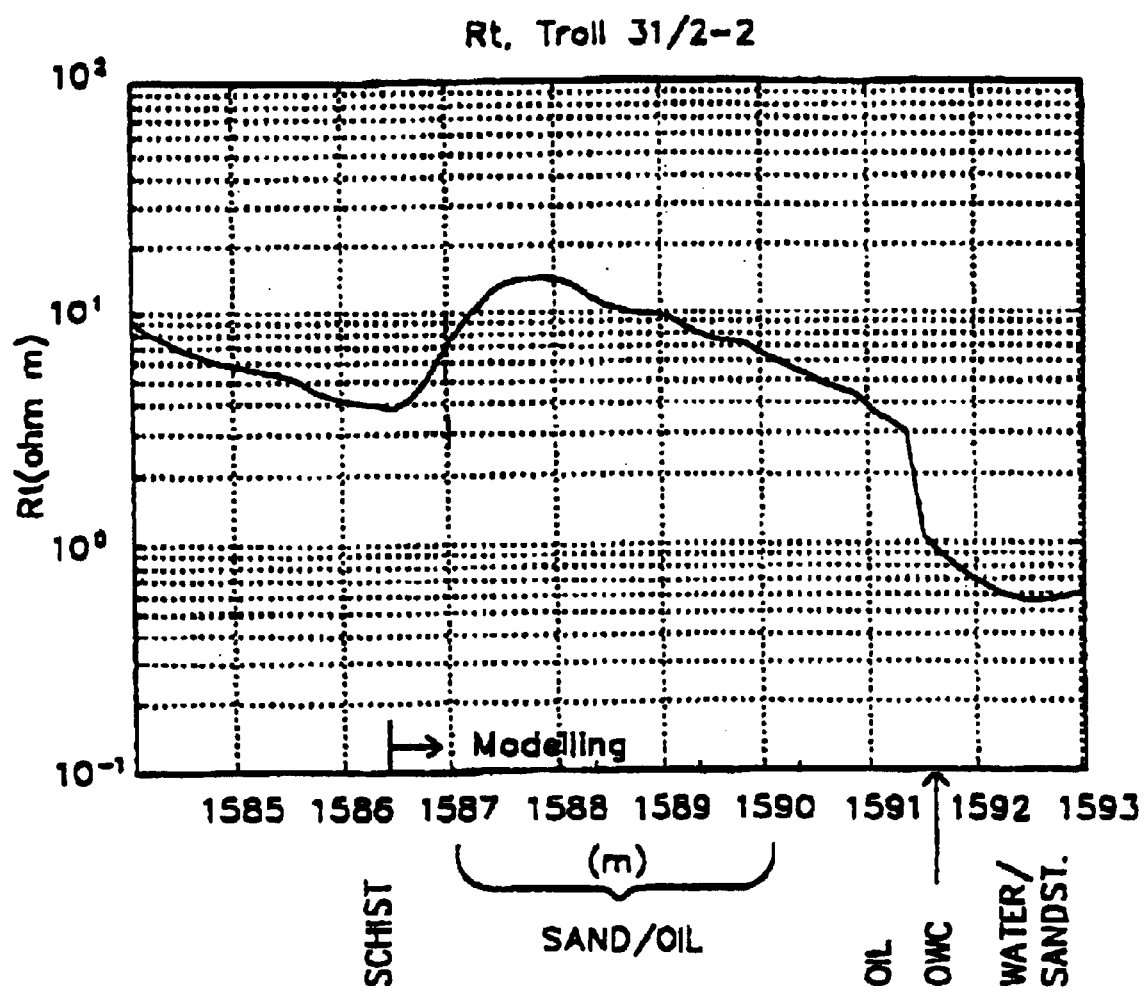
Figure 3C:
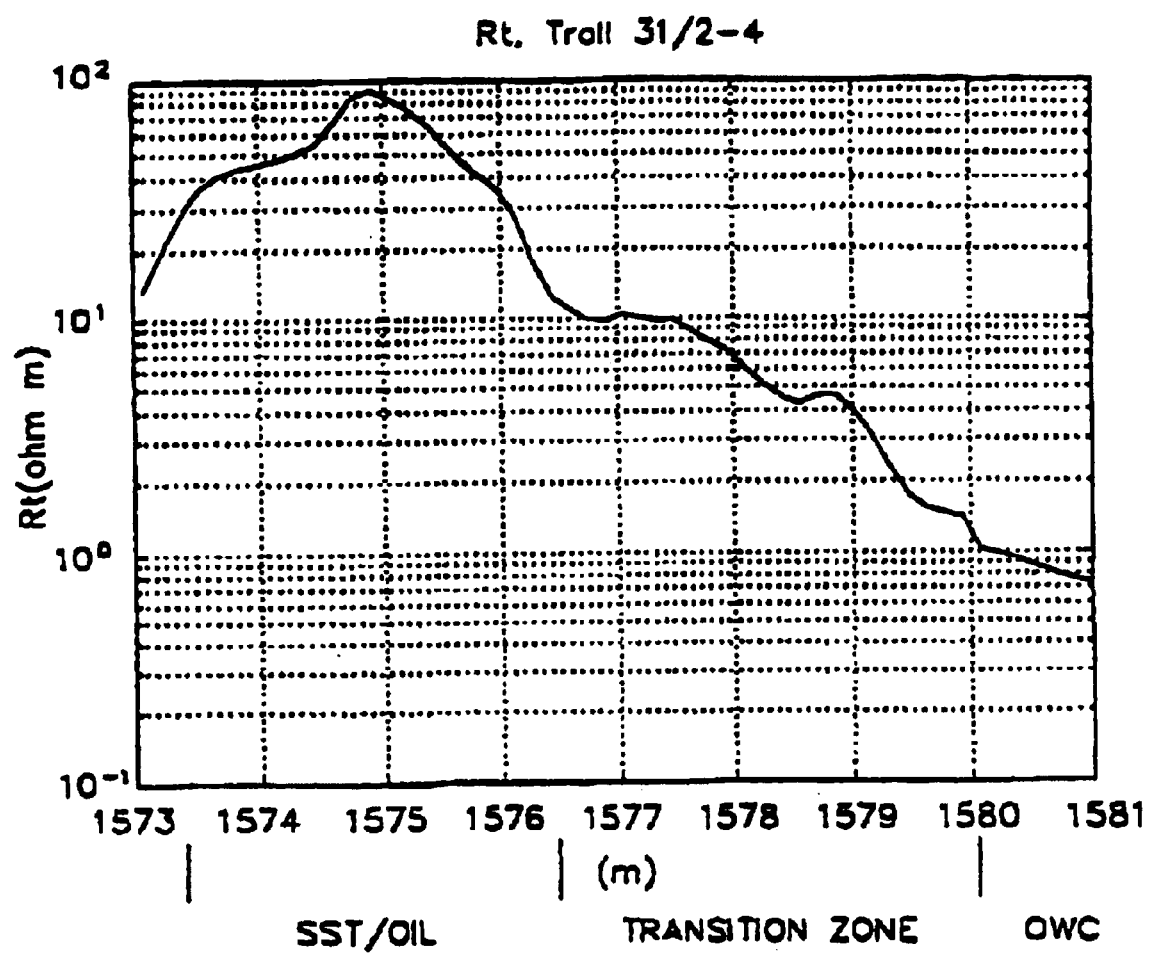
Figure 3D:
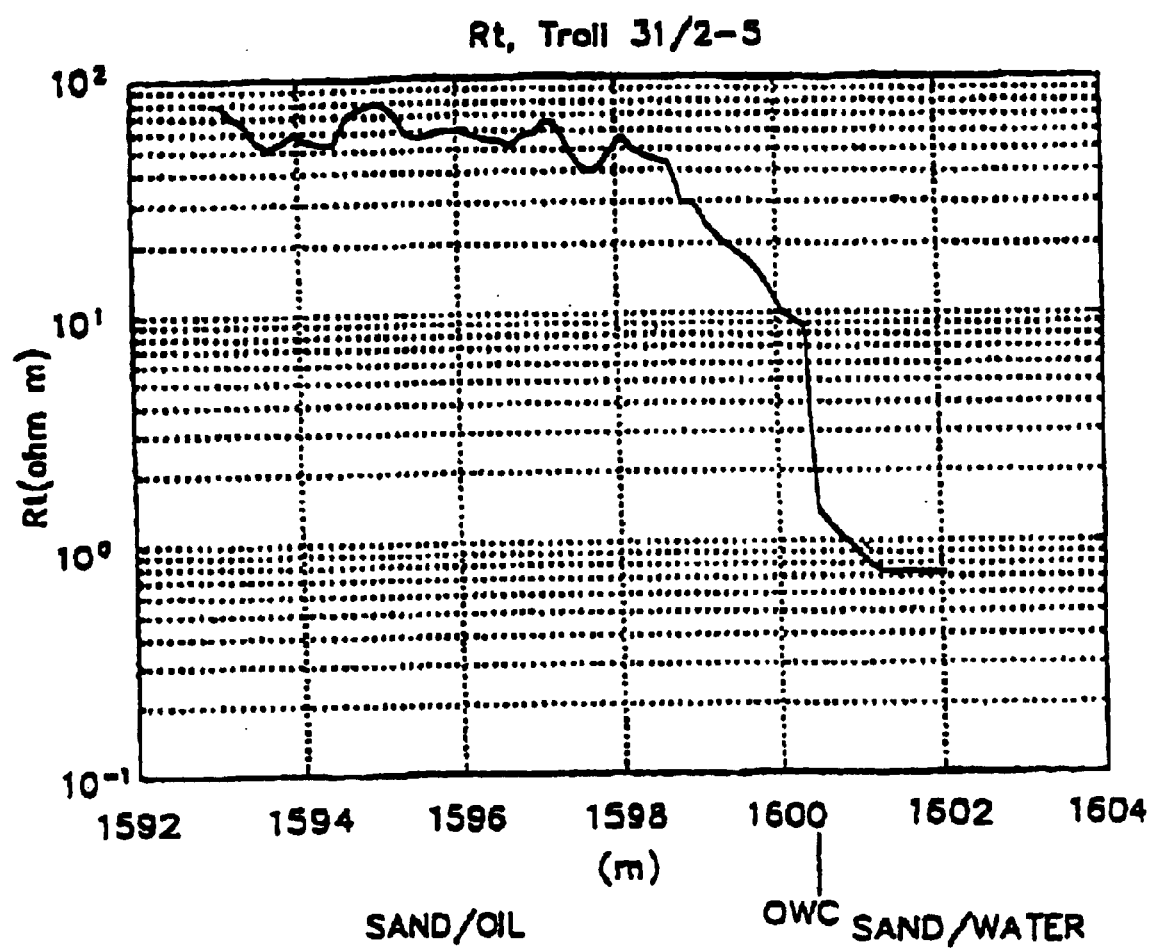
Figure 3E:
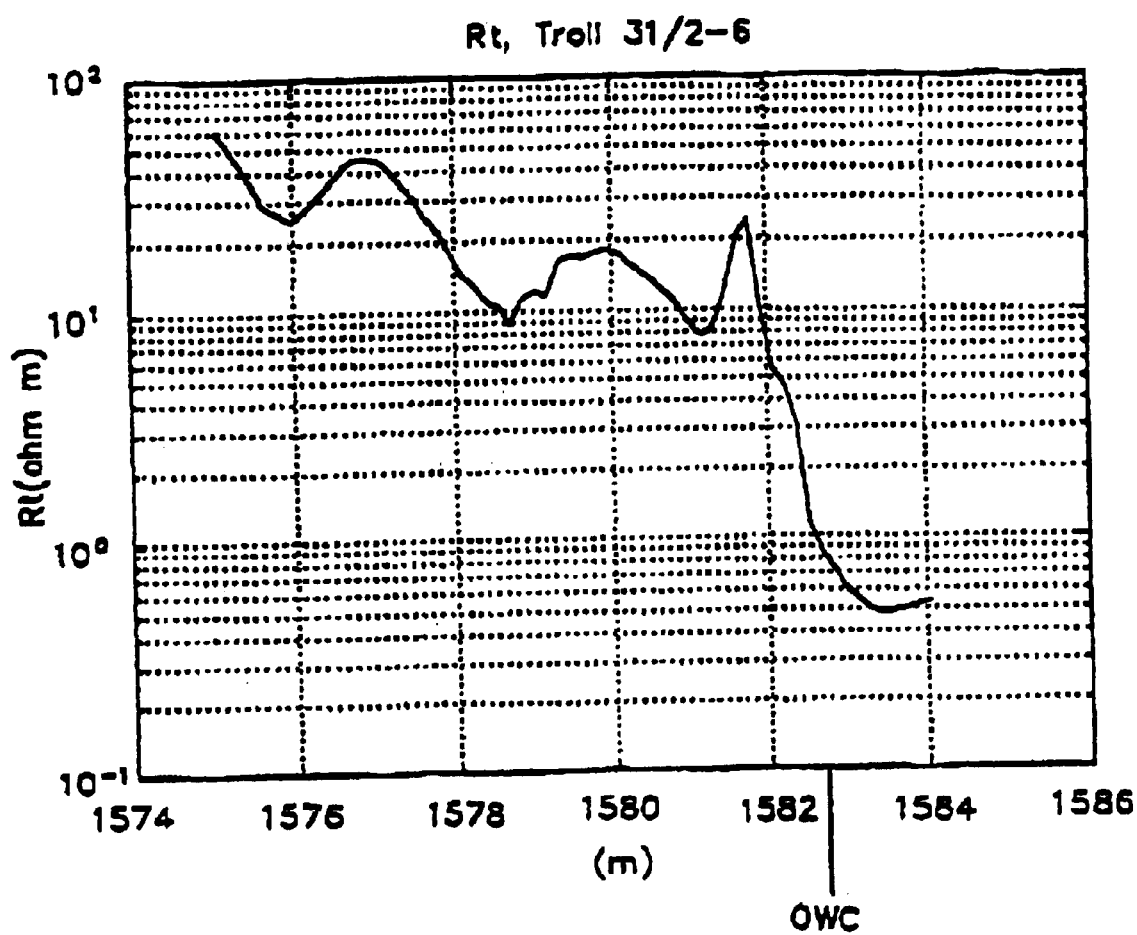
Figure 3F:
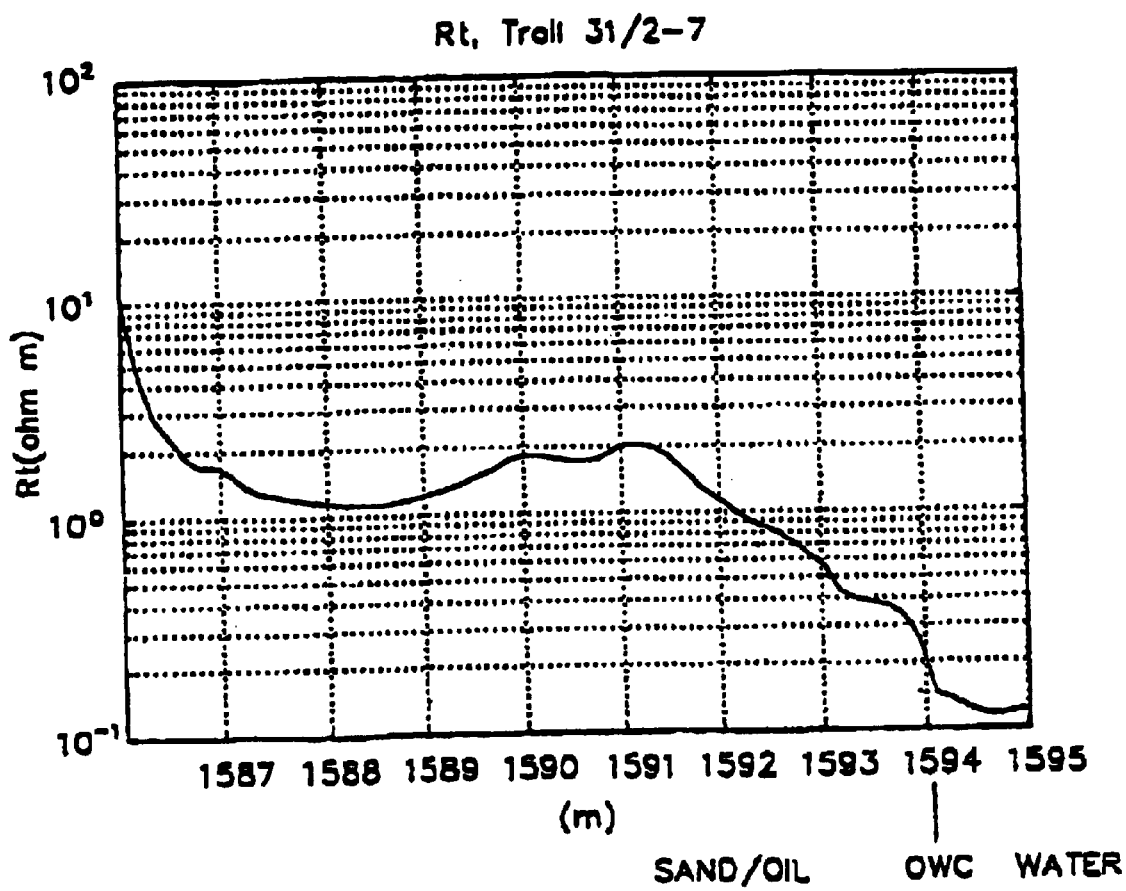
Figure 4A:
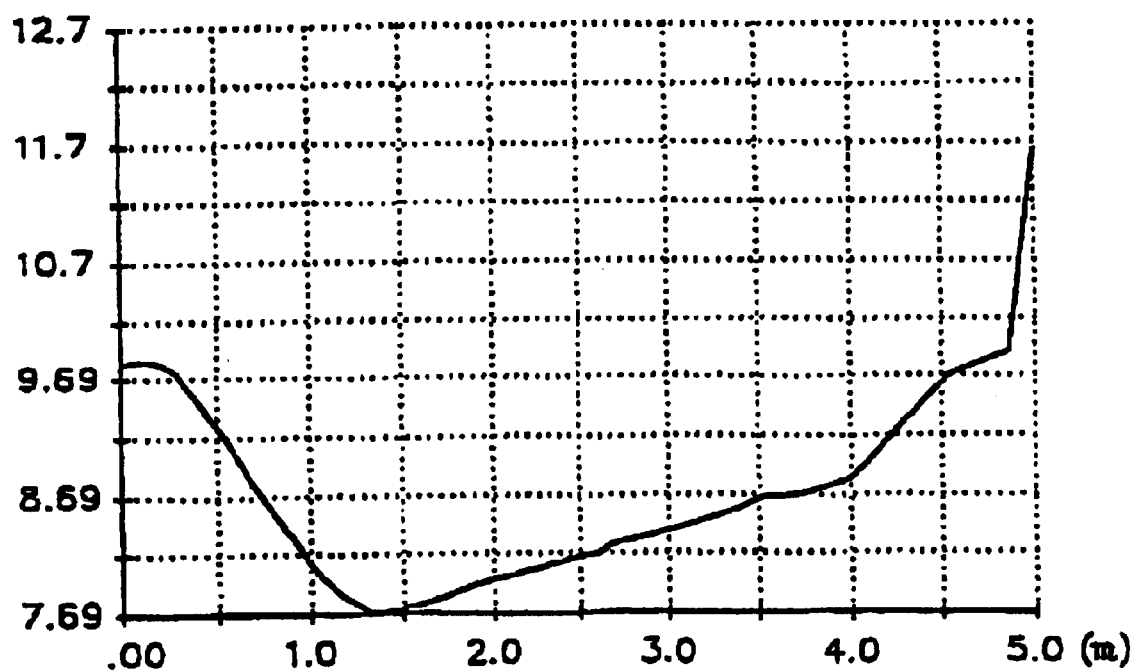
FIGS. 4a, b, c, d, and e display estimated distributions of relative dielectrical values based on water saturation in a five meter transition zone generally over but slightly across the OWC in the same wells FIGS. 3b–f. The scales have 13 as the maximum value, indicating complete water saturation of a 20% porous rock.
Figure 4B:
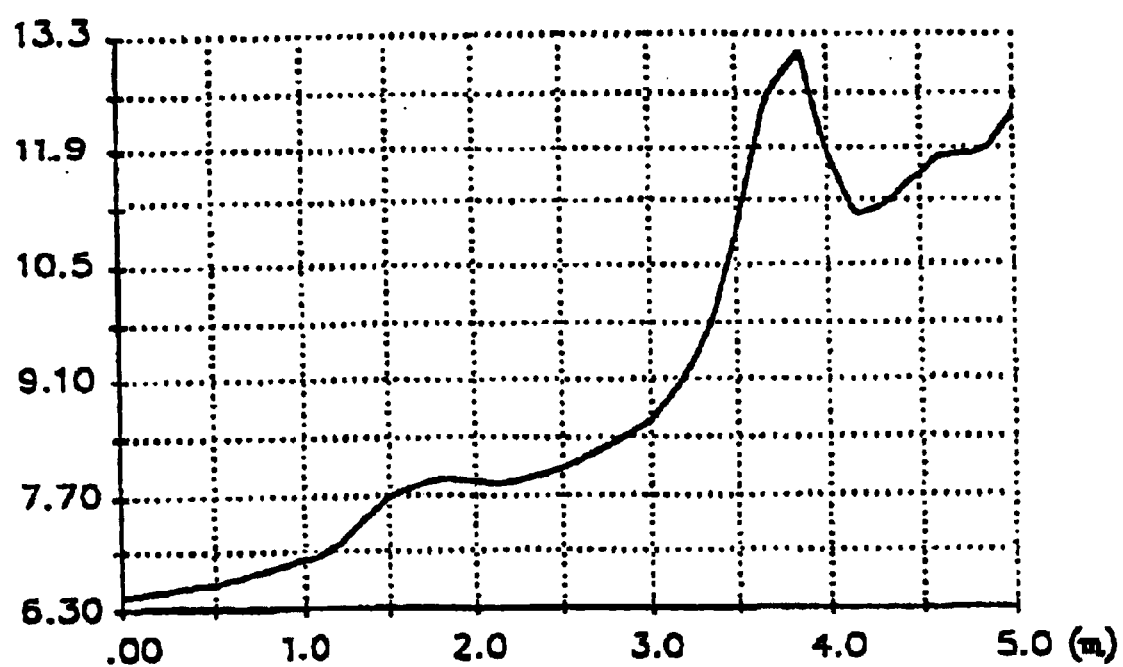
Figure 4C:
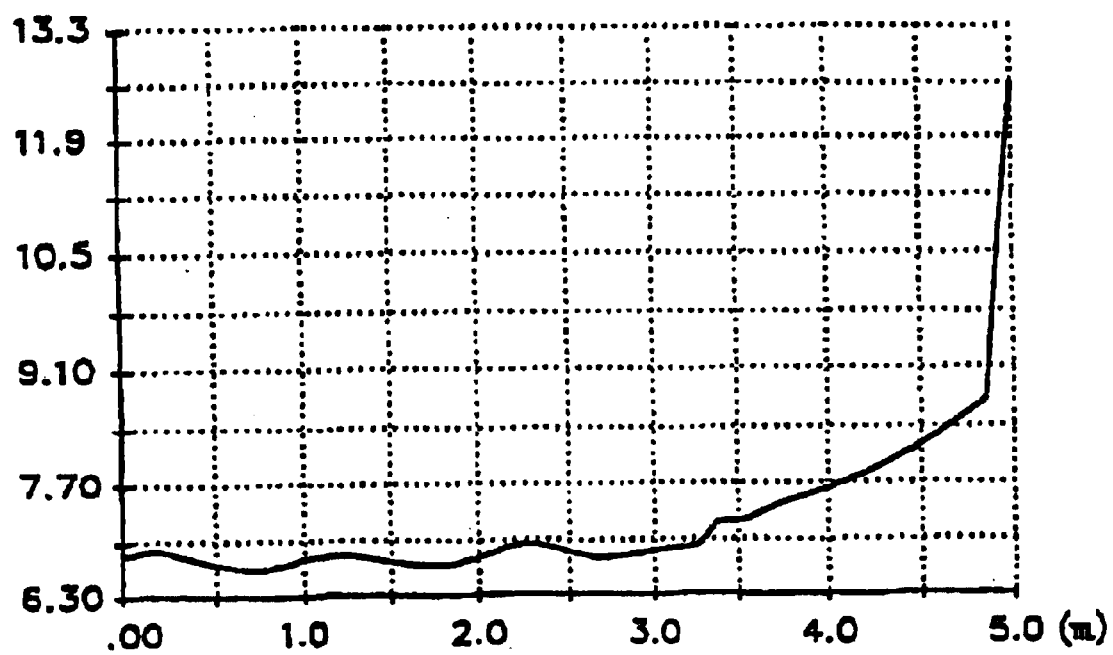
Figure 4D:
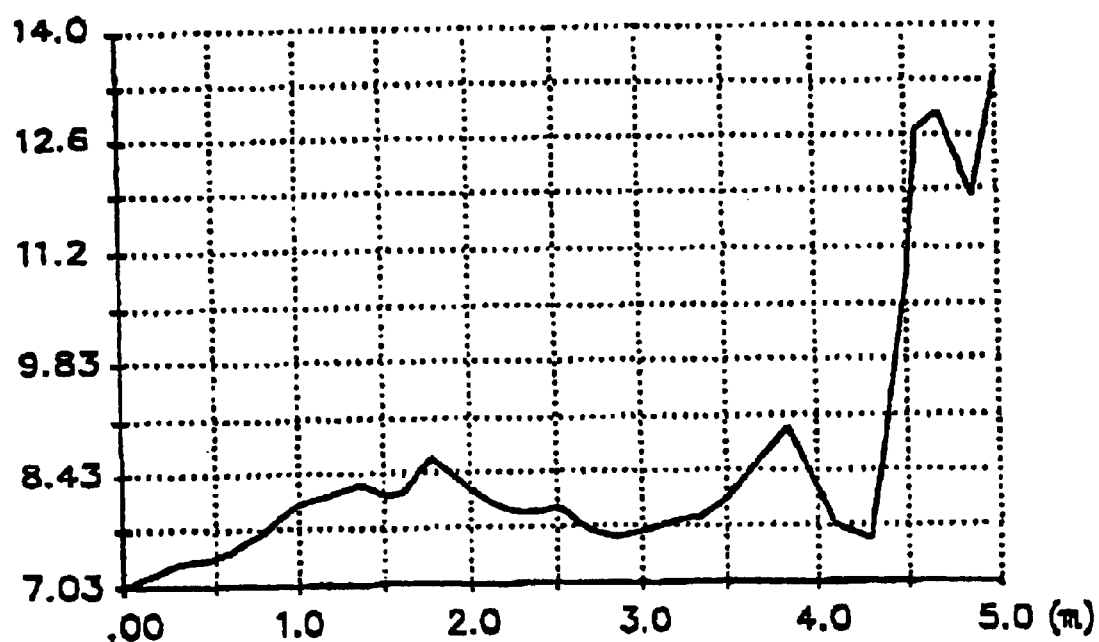
Figure 4E:
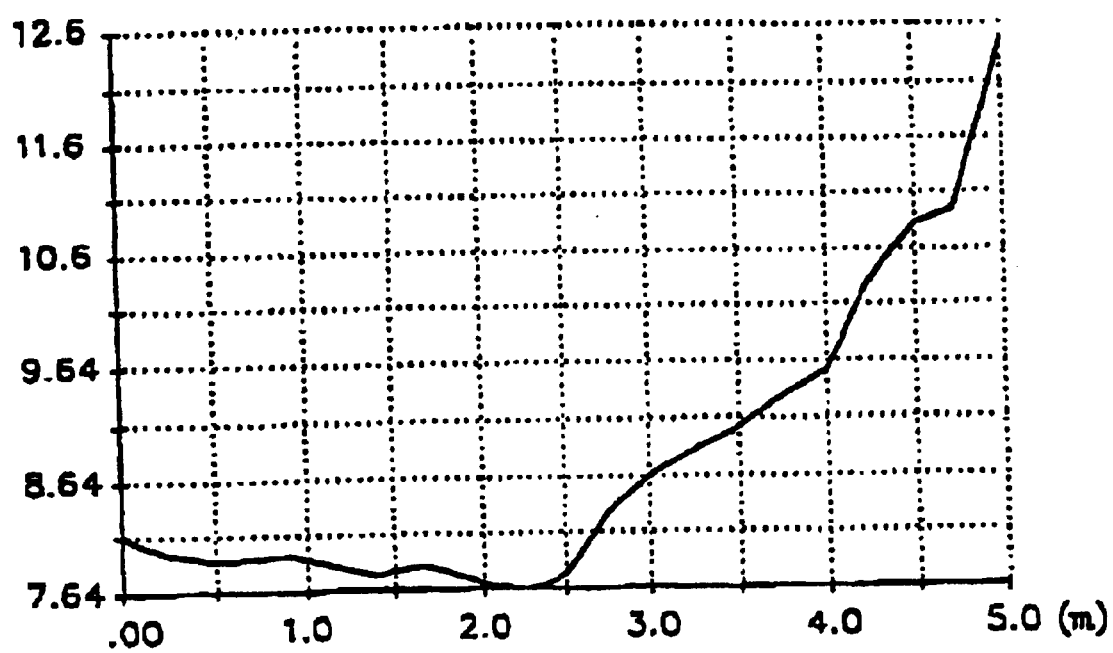
Figure 5A:
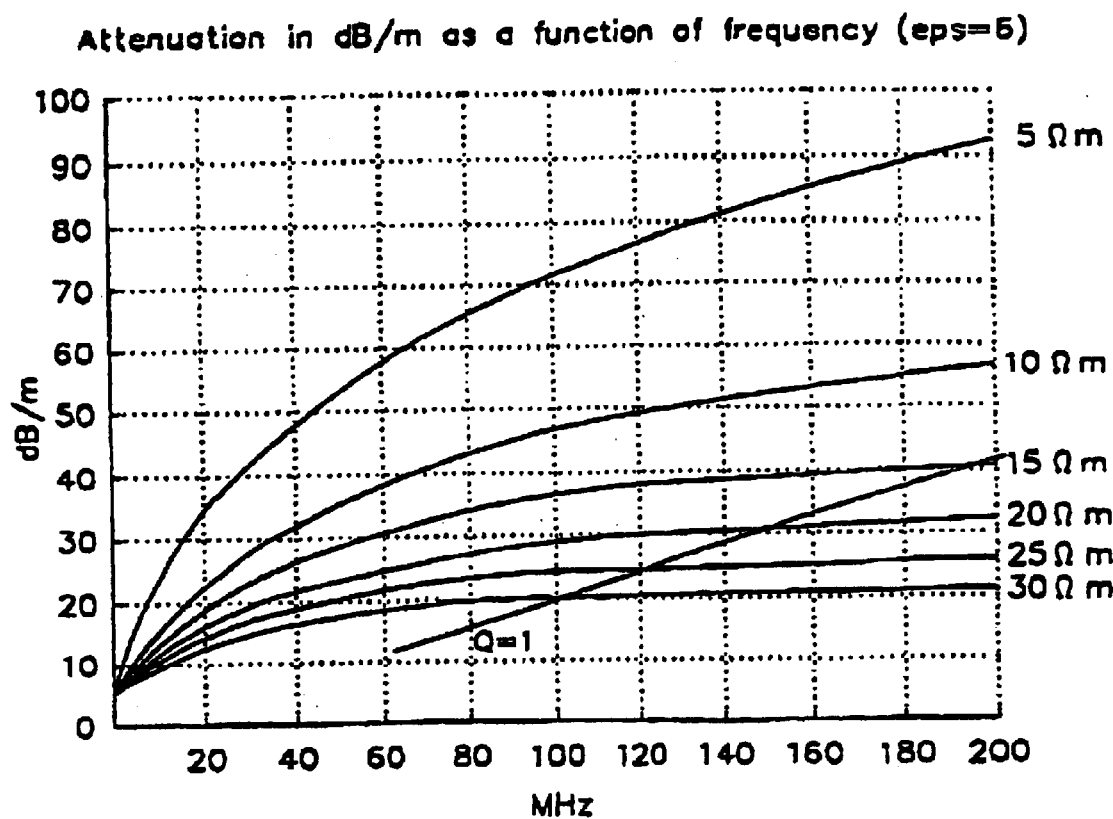
FIG. 5a displays theoretical graphs of electromagnetic waves' attenuation as a function of frequencies between 1 MHz and 200 MHz, for rocks with varying conductivity or resistivity.
Figure 5B:
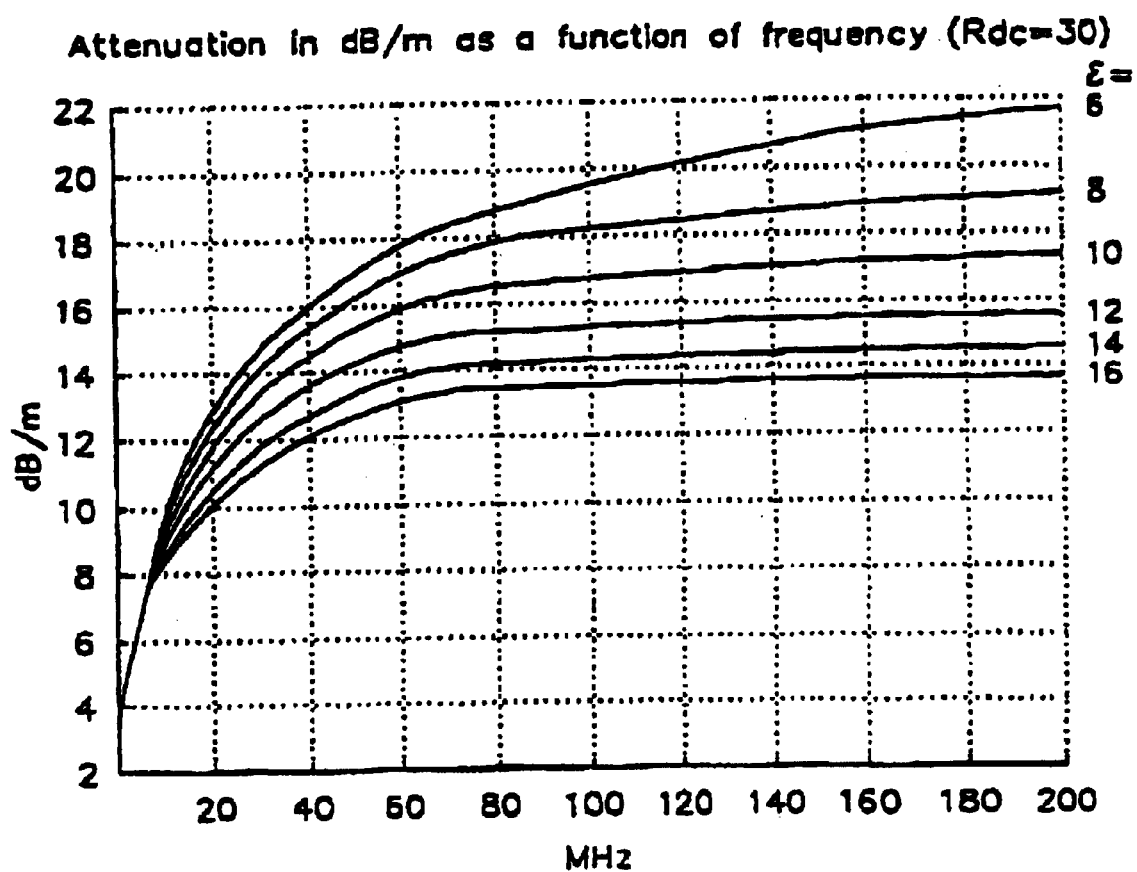
FIG. 5b displays theoretical graphs of electromagnetic waves' attenuation as a function of frequencies between 1 MHz and 200 MHz, for rocks having varying dielectrical constant.
Figure 5C:
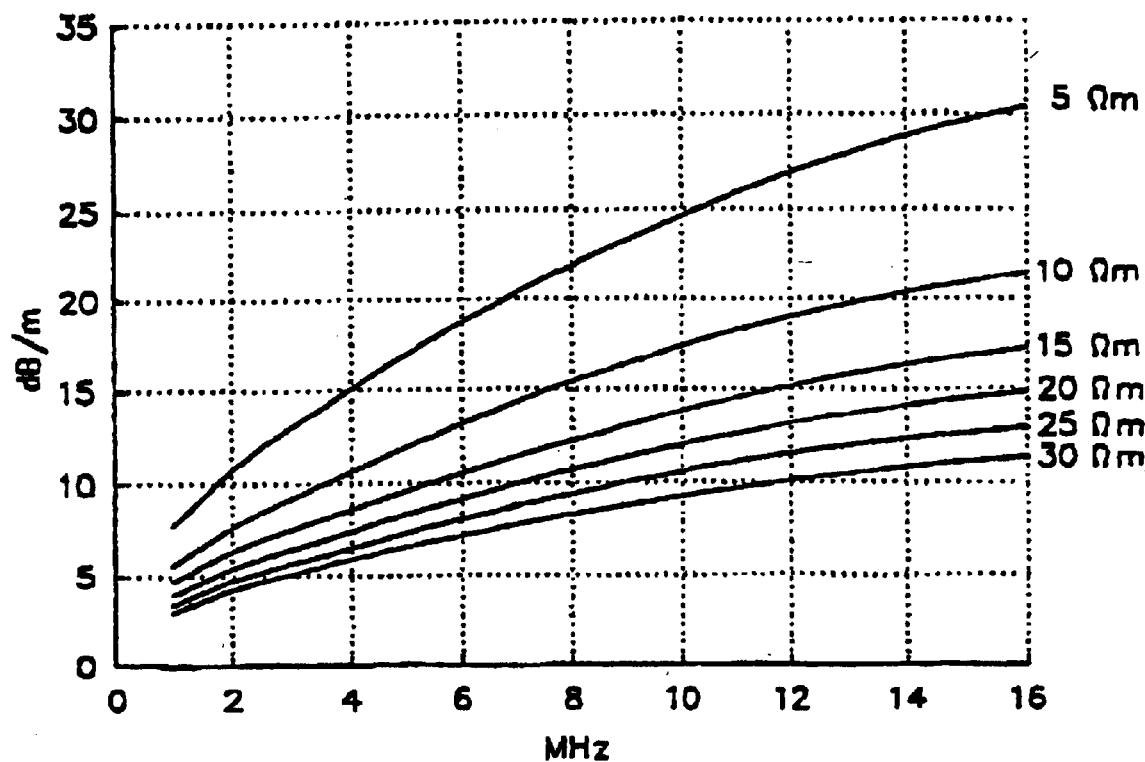
FIG. 5c displays the same the theoretical graphs of waves' attenuation; as FIG. 5a, but limited to a frequency range between 1 and 16 MHz.
Figure 5D:
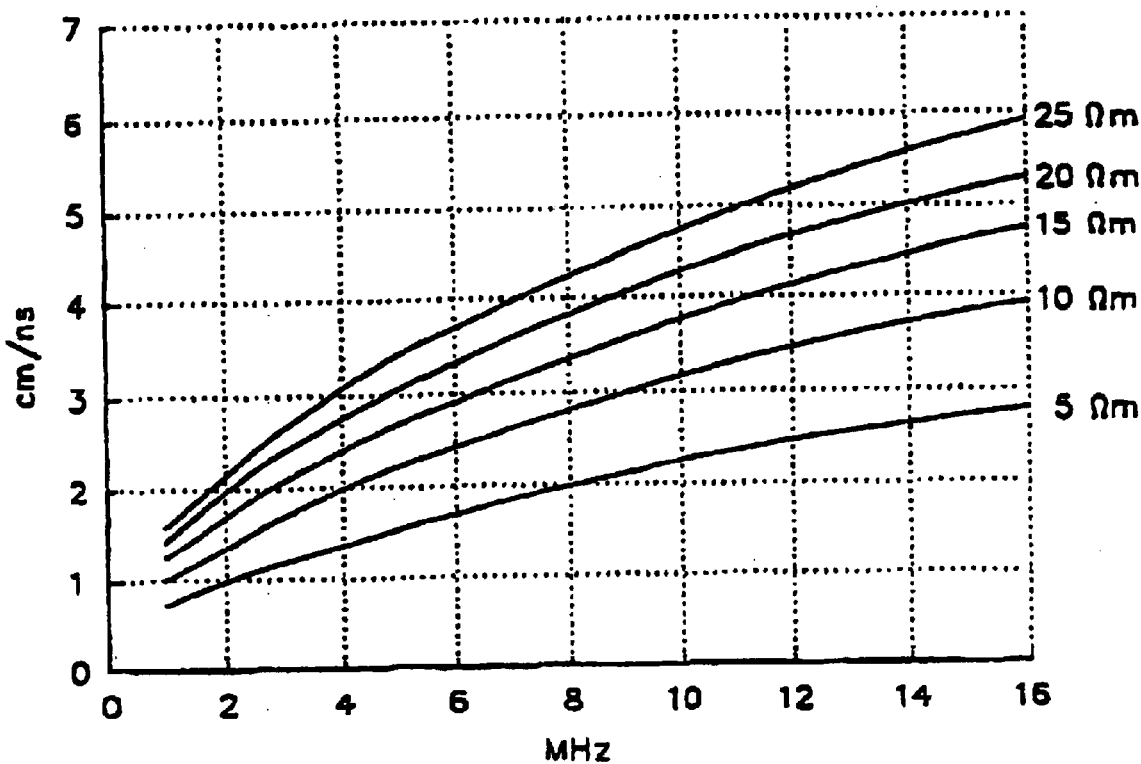
FIG. 5d displays theoretical graphs of phase velocity as a function of frequencies between 1 and 16 MHz.

FIG. 2 displays a principle illustration of a possible embodiment of the invention, with transmitter antennas 2 and receiver antennas 8 arranged near a production tubing 4. If the production tubing 4 is metallic and electrically conductive (as is often the situation), the antennas 2 and 8 must be arranged in the annulus between the production tubing 4 and the geological formation 9. In a preferred embodiment of the invention, the antennas 2 and 8 will be cemented in the annulus in the production zone in the formation 9 so that they are absolutely fixed in position and orientation. This absolute fixation of position and orientation gives measurement- and analysis advantages which are not found in the known art.

The fixed arrangement may be performed in several ways: the antenna may be fixed outside of the tubing string 4, and cemented to the formation by means of cement. In one preferred embodiment of the invention shown in FIG. 6b, transmitter antennas 2 and receiver antennas 8 are arranged in unitary tubing string modules 4, (also referred to herein as "tubing string antenna modules 4'") which may be screw-threadedly joined and work as ordinary components in a tubing string 4 in a production well completion.

A preferred embodiment according to this invention will be applied in an approximately horizontal well 1 in a geological formation 9 as shown in FIG. 1. FIG. 2 displays an arrangement for detection of electrical properties comprising at least one transmitter antenna 2 for emission of electromagnetic waves 26, mounted along a tubing string 4, with the transmitter antenna 2 being fixedly mounted with respect to the geological formation 9, at least one (and preferably more) receiver antenna 8 for receiving the reflected electromagnetic waves 26, arranged along the tubing string 4 in a fixed and permanent position, and unshielded with respect to the geological formation 9. The receiver antennas 8 must be arranged close to the transmitter antennas 2 so that may they under the prevailing surrounding resistivities receive reflected electromagnetic waves. Fixing the antennas' position by the geological formation will normally take place by cementing, which leads to a halt of possibly existing fluid flow between the antenna and the formation. Thus, any possible wellstream must take place inside the well tubing. By stopping the wellstream between the antenna and the geological formation, changing electromagnetic properties of the fluid in the wellstream will not be able to disturb the emitted or received electromagnetic signals. In FIGS. 2 (and 8) it is, due to the legibility, not indicated that the antenna and the tube may be entirely or partially cemented in the well.

A directionally sensitive group 8' comprising three or more receiver antennas 8, are in a preferred embodiment, arranged around the axis of the tubing string 4 and at essentially in the same position along the tubing string 4, arranged to detect the direction of reflected electromagnetic waves 26 and direction of their reflectors with respect to the tubing string's 4 axis. Such directionally sensitive antenna groups 8 are displayed as two groups of dipole antennas 8, with one antenna group 8' arranged on either side of the displayed transmitter antenna 2. In this manner, reflected electromagnetic waves received by several receiver antennas 8 in each particular antenna group 8' may be combined in order to calculate an angle α to the reflector in the plane P which is normal to the tubing string's 4 axis. This is illustrated in FIG. 2. The combination of signals may take place through physical coupling of antenna signals to achieve differences, or combinations may be performed digitally after registering the waves. Phase differences between the incoming signals may also be utilized to find the angle α. An angle β (with respect to the normal plane P) may be calculated by combining reflected electromagnetic signals received by at least two receiver antennas 8 arranged equidistant from the transmitter antenna, as measured along the tubing string 4, and preferably on either side of the transmitter antenna 2. The angles α and β determine uniquely the direction of a reflector. A reflector's distance may be determined by estimating two-way travel time for an electromagnetic pulse. Accordingly, a reflector's position can be calculated with respect to the tubing string 4 and its transmitter antennas 2 and receiver antennas 8.

In addition, it is advantageous to have an embodiment with a transmitter antenna group 2' comprising two or more transmitter antennas 2 arranged around the tubing string's 4 axis and in by the same position along, arranged for emitting electromagnetic waves generally in a selected direction with respect to the tubing string's 4 axis.

Figure 6A:
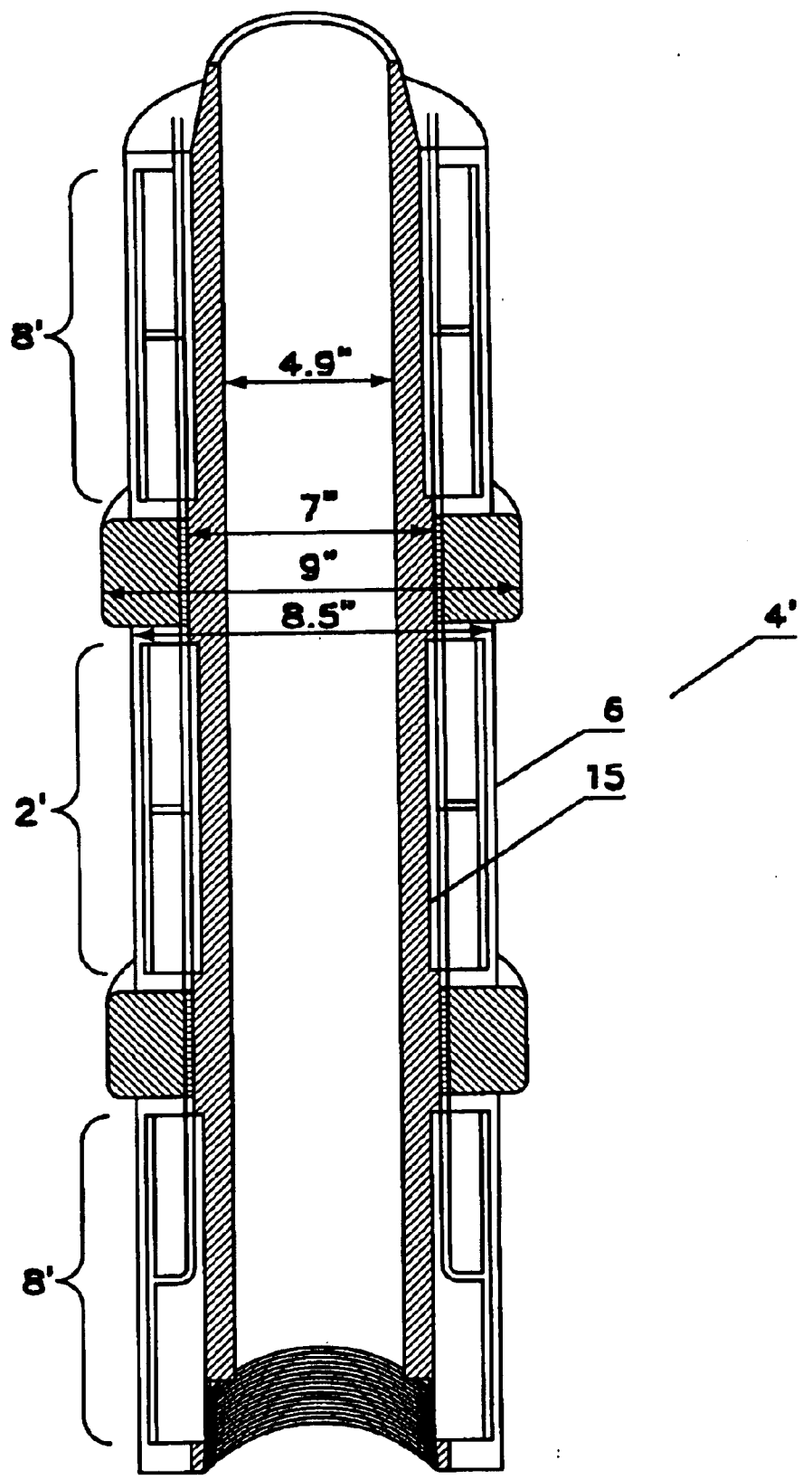
FIG. 6a displays a section of a preferred embodiment of the invention with a module comprising transmitter- and receiver antennas and which may enter the production zone as an ordinary threaded part.
Figure 6A:
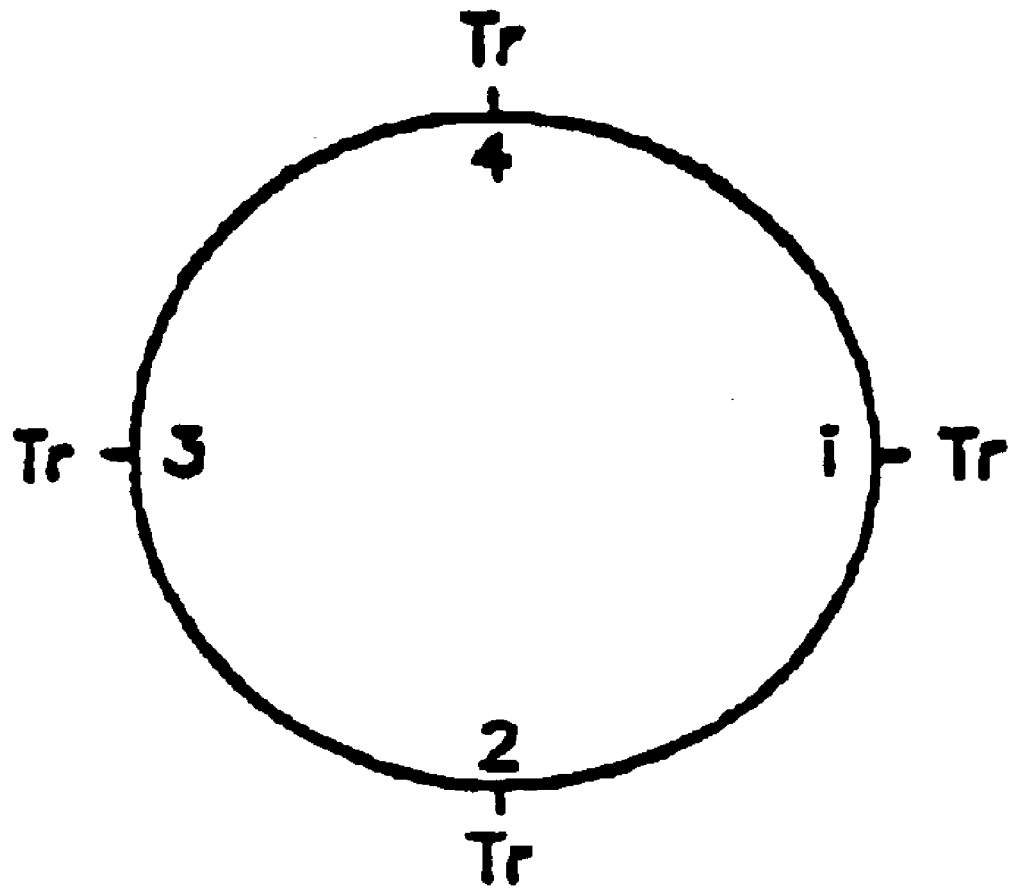

FIG. 6a displays a preferred embodiment of the invention in which transmitter antennas 2 and receiver antennas 8 are combined in one tubing string antenna module 4' which includes a transmitter antenna group 2' having at least two transmitter antennas 2 arranged at a first position along the tubing string antenna module 4', and at least one directionally sensitive group 8' having at least three receiver antennas 8 arranged at a second position along the tubing string antenna module 4'. In the most preferred embodiment the tubing string antenna module 4' comprises a transmitter antenna group 2' having two dipole transmitter antennas 2 arranged on either side of the tubing string 4 at a first position along the tubing string antenna module 4', a first directionally sensitive group 8' having four dipole-receiver antennas 8 arranged with an even angular separation about the tubing string 4 at a second position along the tubing string antenna module 4', and a second directionally sensitive group 8' having four dipole-receiver antennas 8 arranged in the same way at a third position along the tubing string antenna module 4', the opposite side of the transmitter antenna group 2' with respect to the first directionally sensitive group 8'.

Figure 6B:
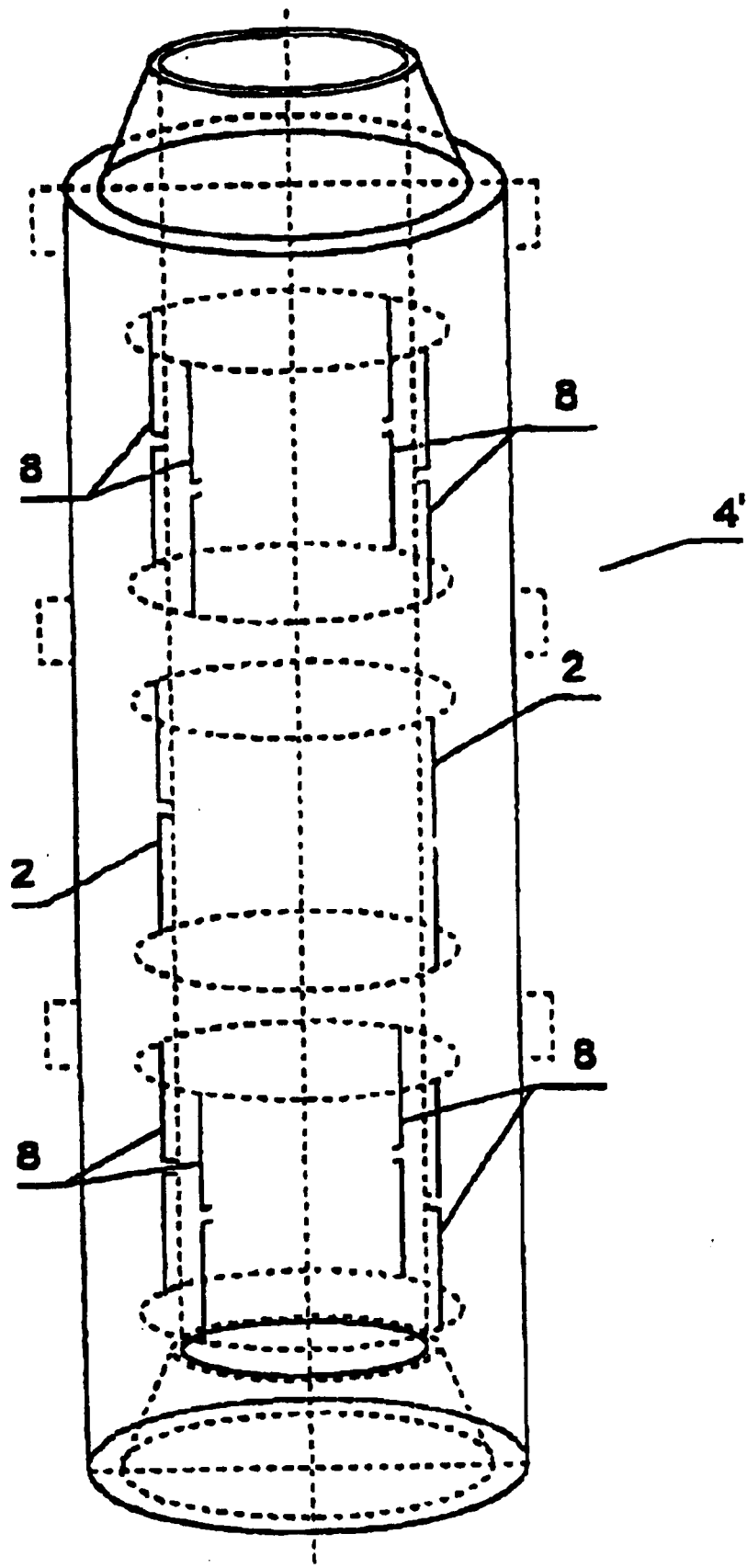
FIG. 6b displays a perspective view of the module of FIG. 6a, with outer conical threading in the top, and correspondingly with inner conical threading in the bottom.
Figure 8:
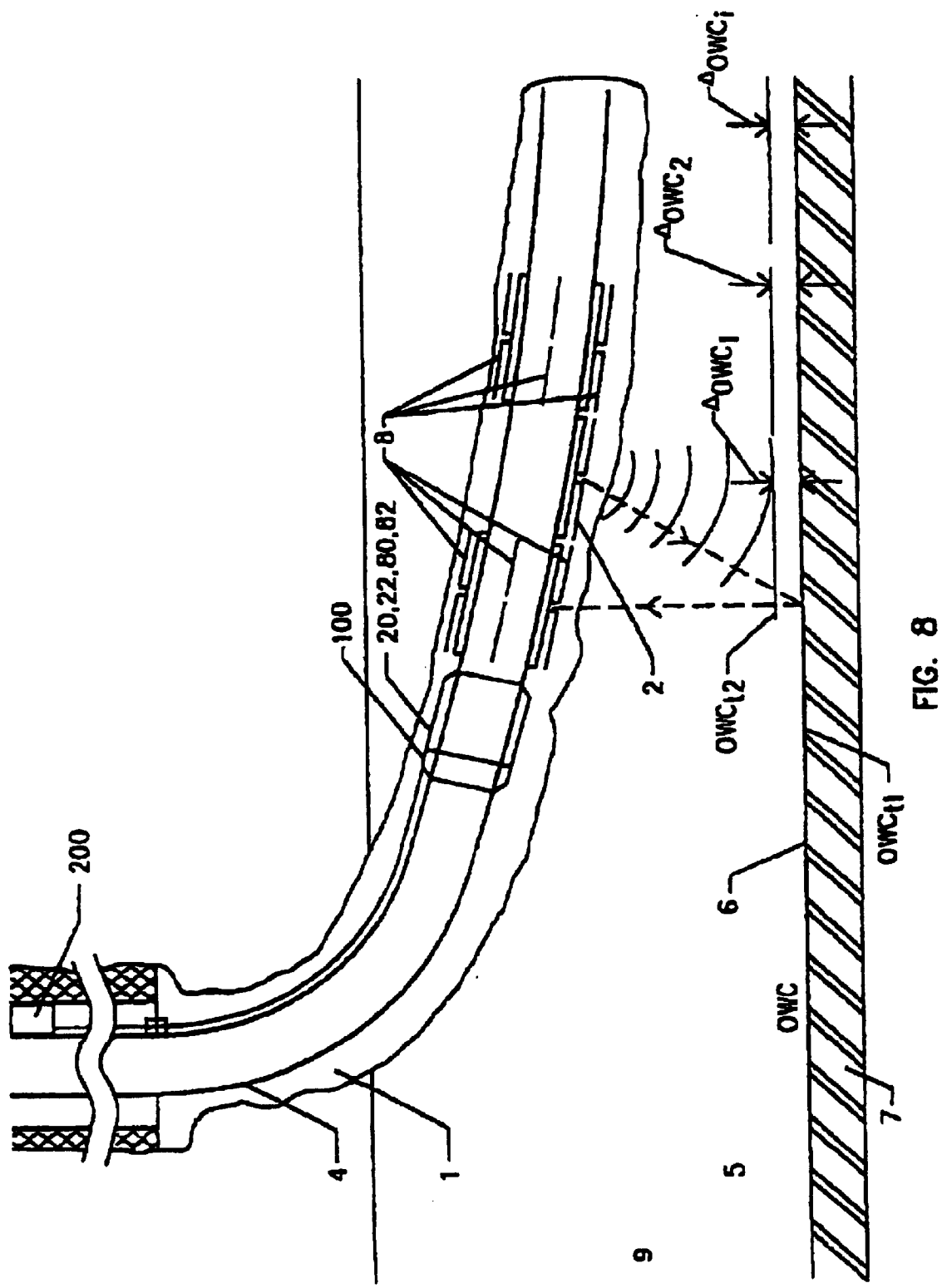
FIG. 8 displays an application of a preferred embodiment of the invention for detection of a change in the distance between the radar and several sections of an oil/water contact OWC.
Figure 9:
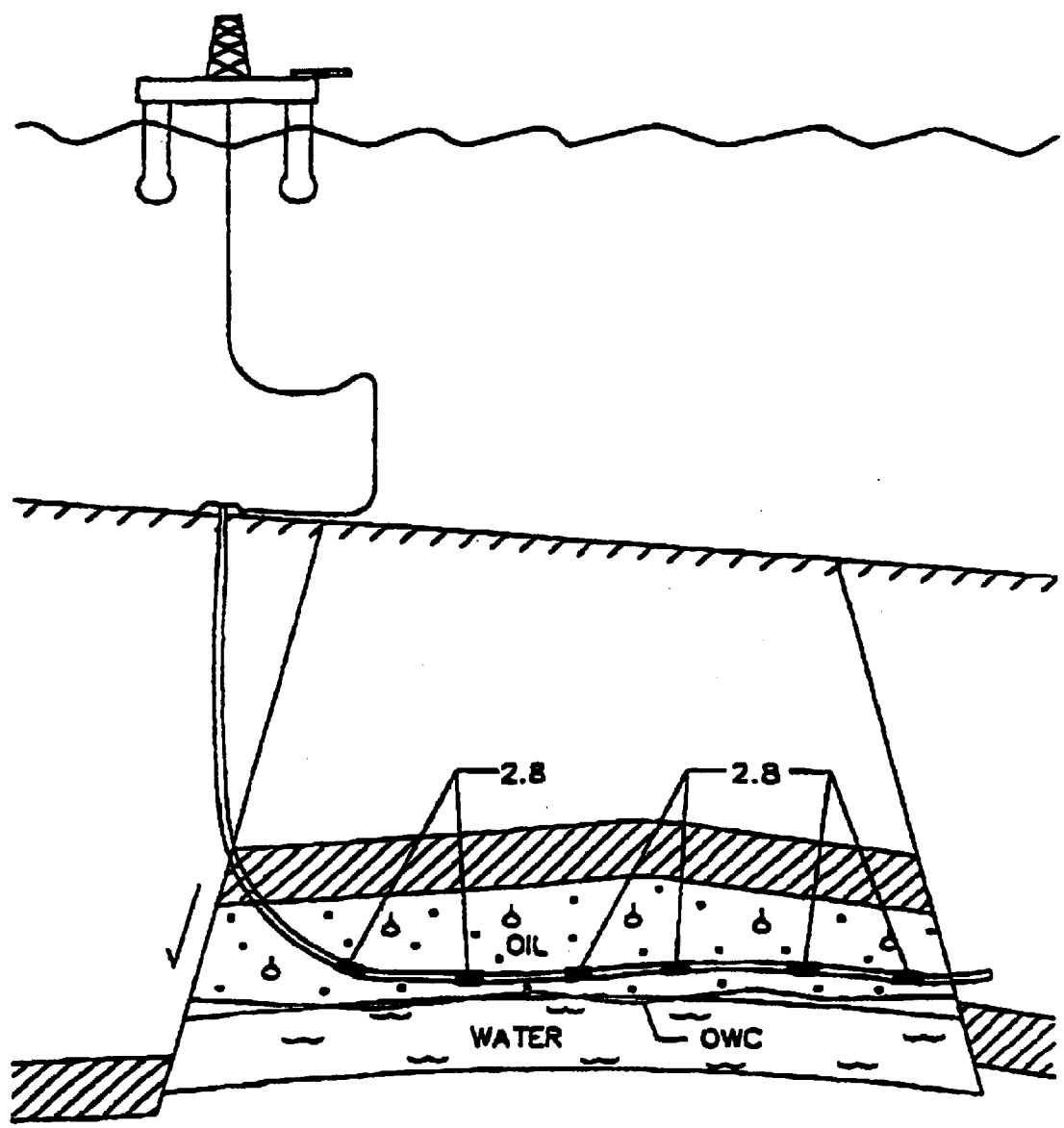
FIG. 9 is a larger perspective view of a well with a corresponding surface arrangement; the with the well comprising transmitter- and receiver antennas in a horizontal production zone with varying distances to the oil/water contact OWC.

FIG. 6b displays a perspective illustration of the tubing string antenna module 4'. The inner dimension in the preferred embodiment is 4.9" and the metallic tube 15 will have a diameter of 7". Ceramic isolators 6 are arranged on the outside of the metallic surface of the tube 15. The ceramic isolators 6 constitute a basis for respective transmitter antennas 2 and receiver antennas 8. In a preferred embodiment, the isolators may be recessed into a cylinder-shaped recess in the metallic tube 15. The entire side surface of the tubing string antenna module [4'] [4'] is covered by a non-conductive jacket in order to DC-isolate the electrical equipment from the well 1 and the geological formation 9. Centralizing devices are also arranged on the outer surface of each tubing string antenna module 4'. In a preferred embodiment, each centralizing device is 9". This does not exclude other dimensions for the tubing string antenna module 4'. Electrical conductors 7 are arranged for energy supply and communication along the tubing string antenna module 4'. The electric conductors 7 provide, with means for electrically and internally, coupling between two or more tubing string antenna modules 4'. The electric conductors 7 also provide means for electrically coupling other equipment such as that on internally and also the surface.

The tubing string antenna module 4' normally constitutes one of a series of identical modules 4' which are combined with other modular parts of a production tubing in a well completion string. The tubing string antenna module is arranged preferably to be fixedly cemented in the well. The module 4' and the electrical conductors 7 must be marked, (e.g.) magnetically, in order not to be broken into pieces during perforation of the production tubing.

An electronics package 20 comprising necessary equipment to run the radar consists of a signal generator 22 for generation of electromagnetic signals 25 to the transmitter antenna 2, devices 80 for reception of signals ($85_1$, $85_2$, ..., $85_n$) induced in each of the receiver antennas ($8_1$, $8_2$, ..., $8_n$), a signal processor 82 for processing the received signals ($85_1$, $85_2$, ..., $85_n$), and communication- and control devices 100 for transmission of signals 105 representing the electrical signals ($85_1$, $85_2$, ..., $85_n$), and for reception of control signals 205. The control signals 205 and energy supply may in a preferred embodiment take from a communication device 200 on the surface, via the electrical conductors 7.

In a preferred embodiment of the invention, the electronics package 20 is situated in the immediate vicinity of the antennas 2, 8. In an additionally preferred embodiment illustrated in FIG. 7, the tubing string antenna module 4' comprises the electronics package 20 which includes an address unit 55, an accumulator- and charging unit 56, a memory unit 54 and a rest mode unit 57. The signal processor 82 may be arranged for downhole processing of measured data. In the preferred embodiment, each tubing string antenna module 4' will be addressable and selectively activated from the communication device 200. The accumulator- and charging device 56 may store energy so that sufficient energy may be emitted into the geological formations from the transmitter antennas 2 in order for the receiver antennas 8 to be able to register signals from reflectors. Due to power limitations on the energy- and communication conductors 7, the rest mode unit 57 is applied to activate different addressable electronics packages 20 with corresponding antennas 2, 8 each in their turn, with respect to charging, emission and processing.

In a preferred embodiment, the signal generator 22 which generates electromagnetic signals 25 and sends them to the transmitter antenna 2, will generate coherent continuous electromagnetic waves 26 to be emitted by the transmitter antenna 2. Thus, one may avoid dispersion of emitted electromagnetic signals due to varying group velocity as a function of the frequency. In an additionally preferred embodiment, the signal generator 22, which generates electrical signals 25 and sends them to to the transmitter antenna 2, will generate coherent continuous electromagnetic waves having a number of i different frequencies $f_1, f_2, \ldots, f_i$ to be emitted by the transmitter antenna 2.

An impedance adjustment device 23 (not shown) adjusts, as needed the transmitter antennas impedance to maximal energy emission into the geological formation 9 at each of the discretely emitted frequencies $f_1, f_2, \ldots, f_i$. This impedance adjustment device 23 may be electronic switches in the dipole antennas 2 themselves. The electronic switches adjust the dipole antennas' physical length. Alternatively, or as a supplement to switches on the antennas, a tuning of the resonance circuits' capacitance by feedback may be performed.

In a corresponding way there is, in the preferred embodiment, an impedance adjustment device 83 (not shown) for adapting the receiver antenna's 8 impedance to each of the emitted discrete frequencies $f_1, f_2, \ldots, f_i$. Thus, the transmitter antennas 2 and the receiver antennas, with corresponding impedance adjustment devices 23, 83, have very similar construction designs.

In order to avoid direct coupling between the transmitter antenna 2 and the receiver antenna 8, there may canceling devices 28 may be arranged to cancel direct waves or directly coupled signals between the transmitter antenna 2 and the receiver antenna 8. Differential coupling between receiver antennas 8 (and, possibly an attenuated differential coupling between a part of the voltage signal 25 to the transmitter antenna 2 and the receiver antenna 8) is a possible solution to cancel the emitted signal from the receiver antenna 8; this is facilitated by the emission of coherent continuous electromagnetic waves 26. By emission of pulsed signals, canceling direct waves or directly coupled signals between the transmitter antenna 2 and the receiver antenna 8 may be performed by means of delayed sampling at the receiver antenna 8 until the direct wave has passed.

The control device 200 is preferably situated on at the sea bottom or the earth's surface, but may be situated on any other surface.

The signal processing devices 82 (for processing of the received signals ($85_1, 85_2, \ldots, 85_n$)) comprise circuits or means for forming at least one discrete Fourier frequency spectrum of at least two of the following parameters: amplitude $A(\omega)$, phase $\phi(\omega)$, the real part of the amplitude $Re(\omega)$, the imaginary part of the amplitude $Im(\omega)$, wherein $\omega$ comprises essentially those frequencies ($f_1, f_2, \ldots, f_i$) which were emitted from the transmitter antenna 2.

In an alternative embodiment, the signal generator 22 may generate and send of pulsed electrical signals 25 to the transmitter antenna 2 as is known in the art.

The radar detects the gradient of resistivity represented by the OWC situated below the approximately horizontal well. Due to sedimentologic processes, the chemical and physical parameters (mineral composition, density, resistivity, permeability) along deposited layers are more constant than through the layers. Thus the resistivity logs displayed in FIG. 4 from the vertical wells display typical resistivity variations which possibly exist between the horizontal well and OWC below the well.

In a producing vertical well the OWC will, due to pressure- and flow conditions, be able to form an almost vertically and conically shaped surface around the production well.

Water in such a deep formation generally is more strongly electrically conductive, with resistivity below 1 $\Omega$m.

The present invention is applied in a preferred embodiment inside the oil zone of the reservoir rock. The resistivity in the oil zone may be between 150 and 1000 $\Omega$m. The transmitter antennas and the receiver antennas for the radar waves are arranged outside on the metallic borehole string (which, in a preferred embodiment, is constituted by a production tubing, but which, in an alternative embodiment, is constituted by a lining pipe) usually made of metal. It is also possible to arrange transmitter- and receiver antennas inside the lining tube or production tube if these tubes are made of non-conductive materials (e.g., composite materials).

The tubing string 4 may comprise a production tubing or a lining or casing pipe. The receiver antennas 8 and the transmitter antennas 2 are situated outside of the surface of the metallic parts of the tubing string 4. If the tubing string 4 is made out of composite materials which do not comprise metal or other electrically conductive materials, the antennas 8 and 2 may be situated inside of or inside the wall of the tubing string 4.

It is also possible to fix the antennas 2 and 8 in other ways than by cementing. For example, the borehole radar with antennas 2 and 8 may be retractable and supplied with a guiding slot/lead fin in order to be reinserted in exactly the same position and orientation in the production zone at a point in time after the first radar detection.

What is claimed is:

1. A device for detection of electrical properties in a geological formation via a well adapted to receive a tubing string, comprising:

at least one transmitter antenna, for emission of electromagnetic waves to be reflected, arranged along the tubing string in a fixed and permanent position thereon, and unshielded with respect to the geological formation;

at least one receiver antenna for receiving the reflected electromagnetic waves, arranged along the tubing string in a fixed and permanent position thereon, and unshielded with respect to the geological formation; and an electronics package comprising a signal generator adapted to apply electromagnetic signals to the at least one transmitter antenna for the emission of coherent, continuous, electromagnetic waves successively at a plurality of frequencies.

2. The device according to claim 1, further comprising:

a directionally sensitive antenna group having three or more of said receiver antennas, wherein the three or more receiver antennas of the directionally sensitive antenna group are approximately equally spaced around an axis of the tubing string, wherein the three or more receiver antennas of the directionally sensitive antenna group are arranged for detecting the direction of both the reflected electromagnetic waves and reflectors that reflect the electromagnetic waves, with respect to the tubing string's axis.

3. The device according to claim 1, further comprising:

a transmitter antenna group having two or more of said transmitter antennas wherein the two or more transmitter antennas of the transmitter antenna group are approximately equally space around an axis of the tubing string, wherein the two or more transmitter antennas of the transmitter antenna group are arranged for emitting electromagnetic waves mainly in a selected direction with respect to the tubing string's axis.

4. The device according to claim 1 further comprising:
a tubing string antenna module having:
- a transmitter antenna group having at least two of said transmitter antennas, said transmitter antenna group arranged in a first group position on the tubing string antenna module, and
- at least one directionally sensitive group having at least three of said receiving antennas, said directionally sensitive group arranged in a second group position on the tubing string antenna module.

5. The device according to claim 4, wherein the tubing string antenna module's transmitter antenna group has two dipole transmitter antennas arranged on either side of the tubing string antenna module in a first antenna position on the tubing string antenna module, wherein a first of said at least one directionally sensitive group has four dipole receiver antennas arranged with even angular separation about the tubing string antenna module in a second antenna position on the tubing string antenna module, and wherein a second of said at least one directionally sensitive group has four dipole receiver antennas arranged with even angular separation about the tubing string antenna module in a third antenna position on the tubing string antenna module at the opposite side of the transmitter antenna group with respect to the first directionally sensitive group.

6. The device according to claim 5, wherein said electronics package further comprises:
- signal reception devices for receiving signals induced in each of the receiver antennas,
- a signal processor for processing the signals received by the signal reception devices, and
- at least one communication device for transmitting signals representing the signals received by the signal reception devices and for receiving control signals.

7. The device according to claim 6, further comprising:
an impedance adjustment device for adjusting the at least one transmitter antenna's impedance to each of the plurality of frequencies.

8. The device according to claim 6, further comprising:
an impedance adjustment device for adjusting the at least one receiver antenna's impedance to each of the plurality of frequencies.

9. The device according to claim 6, wherein the electronics package is situated in the immediate vicinity of the at least one transmitter antenna and the at least one receiver antenna.

10. The device according to claim 9, wherein the tubing string antenna module comprises the electronics package.

11. The device according to claim 9, wherein the electronics package additionally comprises an address unit, an accumulating and charging unit, a memory device, and a rest mode unit.

12. The device according to claim 6, further comprising:
a control unit; and
an electrical energy supply and communication line positioned between the at least one communication device and the control unit.

13. The device according to claim 12, wherein the control unit is situated on a bottom of a sea or on a surface of the earth.

14. The device according to claim 6, wherein the signal processor forms at least one discrete Fourier frequency spectrum of at least two parameters selected from the group consisting of amplitude $A(\omega)$, phase $(\omega)$, the real part of the amplitude $Re(\omega)$, and the imaginary part of the amplitude $Im(\omega)$, wherein $\omega$ comprises the plurality of frequencies which were emitted form the at least one transmitter antenna.

15. The device according to claim 6, wherein the signal generator generates and sends pulsed electrical signals to the at least one transmitter antenna.

16. The device according to claim 1, further comprising:
canceling devices for canceling direct waves or directly coupled signals between the at least one transmitter antenna and the at least one receiver antenna.

17. The device according to claim 16, further comprising:
a differential coupling between receiver antennas; and
a differential coupling between the at least one transmitter antenna and the at least one receiver antenna.

18. The device according to claim 16, wherein the canceling devices use delayed sampling to cancel the direct waves or directly coupled signals between the at least one transmitter antenna and the at least one receiver antenna.

* * * * *